(12) United States Patent
Li et al.

(10) Patent No.: US 12,069,643 B2
(45) Date of Patent: Aug. 20, 2024

(54) CO-EXISTENCE OF LEGACY AND LOW-BANDWIDTH CORESET-0

(71) Applicant: QUALCOMM Incorporated, San Diego, CA (US)

(72) Inventors: Qiaoyu Li, Beijing (CN); Chao Wei, Beijing (CN); Chenxi Hao, Beijing (CN); Liangming Wu, Beijing (CN); Yu Zhang, San Diego, CA (US); Yuwei Ren, Beijing (CN); Changlong Xu, Beijing (CN); Min Huang, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/596,065

(22) PCT Filed: Jun. 28, 2019

(86) PCT No.: PCT/CN2019/093564
§ 371 (c)(1),
(2) Date: Dec. 2, 2021

(87) PCT Pub. No.: WO2020/258216
PCT Pub. Date: Dec. 30, 2020

(65) Prior Publication Data
US 2022/0304014 A1    Sep. 22, 2022

(51) Int. Cl.
*H04W 72/12*  (2023.01)
*H04W 72/04*  (2023.01)
(Continued)

(52) U.S. Cl.
CPC ... *H04W 72/1263* (2013.01); *H04W 72/0446* (2013.01); *H04W 72/0453* (2013.01); *H04W 72/23* (2023.01)

(58) Field of Classification Search
CPC ............ H04W 72/1263; H04W 72/23; H04W 72/0446; H04W 72/0453
See application file for complete search history.

(56) References Cited

U.S. PATENT DOCUMENTS

| | | | |
|---|---|---|---|
| 2019/0098590 A1 | 3/2019 | Nam et al. | |
| 2021/0328700 A1* | 10/2021 | Hu | H04J 11/0073 |
| 2023/0007524 A1* | 1/2023 | Wang | H04L 5/0064 |

FOREIGN PATENT DOCUMENTS

| | | |
|---|---|---|
| CN | 109802789 A | 5/2019 |
| EP | 3451553 A2 | 3/2019 |
| WO | 2018226033 A1 | 12/2018 |

OTHER PUBLICATIONS

Huawei, HiSilicon, 'Configuration of control resource set', R1-1712182, 3GPP TSG RAN WG1 Meeting #90, Aug. 21-25, 2017, pp. 1-5. (Year: 2017).*

(Continued)

*Primary Examiner* — Melvin C Marcelo
(74) *Attorney, Agent, or Firm* — Procopio, Cory, Hargreaves & Savitch LLP

(57) ABSTRACT

Aspects are provided which allow a user equipment (UE) to identify a low-bandwidth (low-BW) CORESET-0 and associated CSS based on reception bandwidth of the UE. The base station may configure different frequency and time-domain resources of the low-BW CORESET in order to optimize resource utilization of the low-BW CORESET-0, and the low-tier UE may identify these resources of CORESET-0 and CSS from the system configuration information received in a master information block (MIB). As a result, low tier UEs may operate in a same cell as legacy UEs without the need for the base station to transmit additional signaling to either legacy UEs or lower tier UEs for the UEs to receive their respective CORESET-0's and identify a physical downlink channel (PDCCH).

35 Claims, 17 Drawing Sheets

(51) Int. Cl.
  *H04W 72/0446* (2023.01)
  *H04W 72/0453* (2023.01)
  *H04W 72/1263* (2023.01)
  *H04W 72/23* (2023.01)

(56) References Cited

OTHER PUBLICATIONS

Ericsson: "On Configuration of Control Resource Sets and Search Space", 3GPP TSG RANI WG1 Meeting NR#3, R1-1716578, 3rd Generation Partnership Project, Mobile Competence Centre, 650, Route Deslucioles, F-06921 Sophia-Antipolis Cedex, vol. RAN WG1, No. Nagoya, Japan, Sep. 18, 2017-Sep. 21, 2017, 12 Pages, Sep. 17, 2017, XP051340030, p. 1, Paragraph 2.1-p. 5, Paragraph 2.1.2, p. 6, Paragraph 2.2, p. 7.

Huawei, et al., "Configuration of Control Resource Set", 3GPP TSG RAN WG1 NR Ad Hoc Meeting, R1-1709951, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017, 5 Pages, XP051299176, p. 1 Paragraph 2, p. 2 Paragraph 2.1, p. 4, Paragraph 3, Figure 1.

SAMSUNG: "On PDCCH Structure", 3GPP TSG RAN WG1 Meeting 90bis, R1-1717641, 3rd Generation Partnership Project, Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017, 8 Pages, XP051340827, p. 1, Paragraph 2.1, Figure 1.

Supplementary European Search Report—EP19934614—Search Authority—The Hague—Dec. 21, 2022.

Fujitsu: "EPDCCH Search Space Design to Support Narrow Band Operation", 3GPP TSG RAN WG1 #68, R1-120764, Dresden, Germany, Feb. 6-10, 2012, pp. 1-2.

Huawei, et al., "PDCCH-based Power Saving Signal/Channel", 3GPP TSG RAN WG1 Meeting #97, R1-1906005, May 17, 2019 (May 17, 2019), 10 Pages, the whole document.

International Search Report and Written Opinion—PCT/CN2019/093564—ISA/EPO—Mar. 26, 2020.

Nokia, et al., "On Wideband Operation in NR-U", 3GPP TSG RAN WG1 Meeting #96bis, R1-1904194 Apr. 12, 2019 (Apr. 12, 2019), 15 Pages, the whole document.

QUALCOMM: "NR-Lite for Rel-17 Qualcomm Views", 3GPP RAN #84, RP-190844-NRLITE-R17-QCOM, 3rd Generation Partnership Project (3GPP), Mobile Competence Centre, 650, Route Des Lucioles, F-06921, Sophia- Antipolis Cedex, France, France, No. Newport Beach, Jun. 3, 2019-Jun. 6, 2019, Jun. 2, 2019 (Jun. 2, 2019), XP051746128, 11 pages, Retrieved from the Internet: URL: http://www.3gpp.org/ftp/Meetings%5F3GPP%5FSYNC/RAN/Docs/RP%2D190844%2Ezip [retrieved on Jun. 2, 2019] p. 6, pp. 3-7.

* cited by examiner

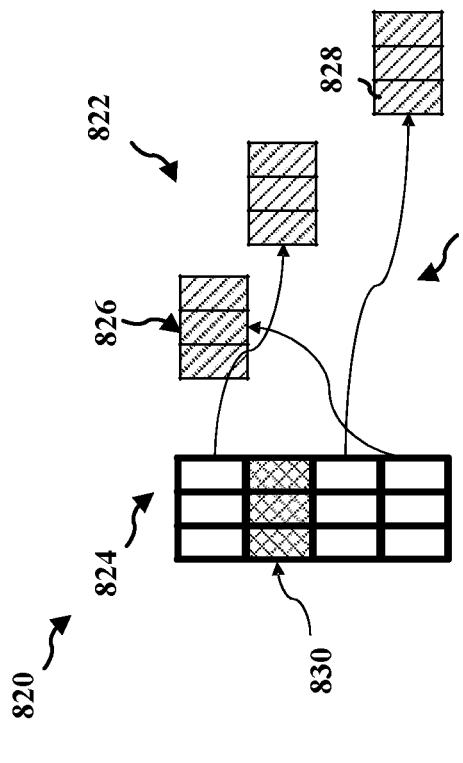
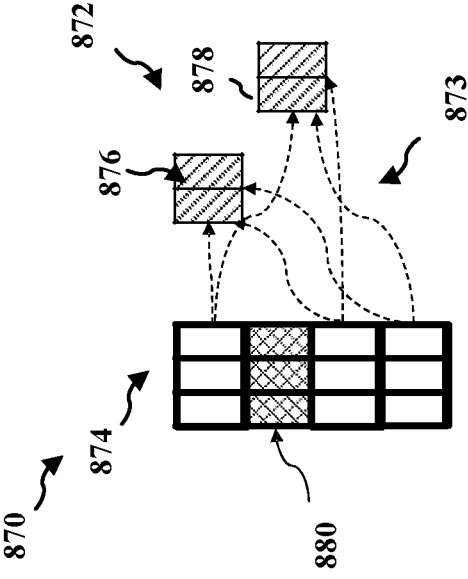
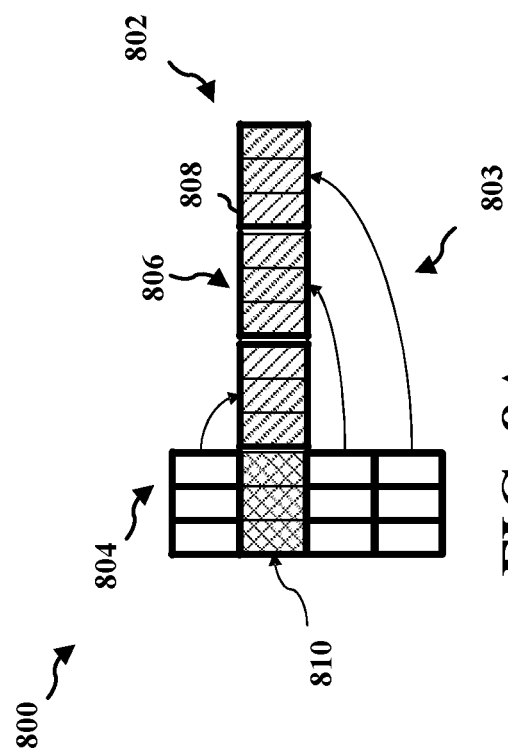
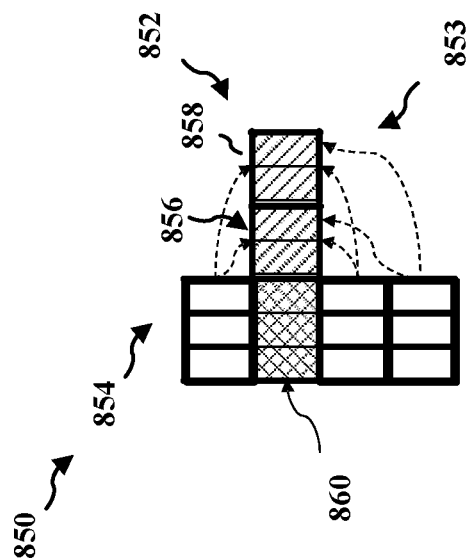
FIG. 8A
FIG. 8B
FIG. 8C
FIG. 8D

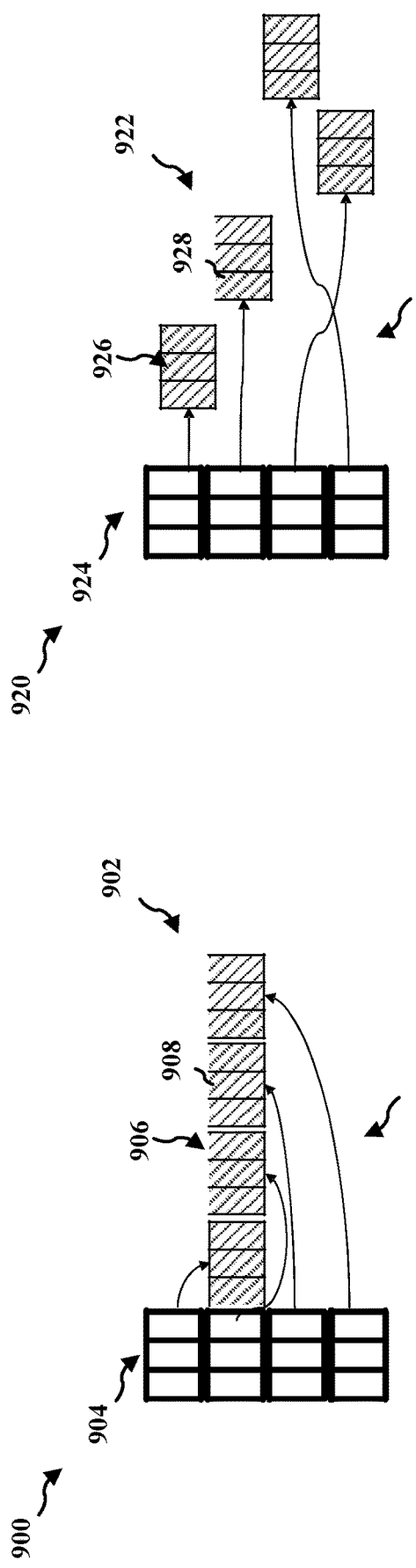

CO-EXISTENCE OF LEGACY AND LOW-BANDWIDTH CORESET-0

CROSS REFERENCE TO RELATED APPLICATION(S)

This application is a National Stage Application filed under 35 U.S.C. § 371 of PCT International Patent Application Serial No. PCT/CN2019/093564, entitled "COEXISTENCE OF LEGACY AND LOW-BANDWIDTH CORESET-0" and filed on Jun. 28, 2019, which is expressly incorporated by reference herein in its entirety.

BACKGROUND

Technical Field

The present disclosure relates generally to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain UEs (for example, NR-Light UEs or Low-Tier NR UEs) may be lower tier, or have reduced capabilities, than other UEs (e.g. legacy UEs). As an example, lower tier UEs may have reduced transmission power than legacy UEs. For instance, a lower tier UE may have a typical uplink transmission power of at least 10 dB less than that of legacy enhanced mobile broadband (eMBB) UE. As another example, lower tier UEs may have reduced transmission bandwidth or reception bandwidth than other UEs. For instance, a lower tier UE may have an operating bandwidth between 5 MHz and 10 MHz for both transmission and reception, in contrast to other UEs which may have 20-100 MHz bandwidth. As a further example, a lower tier UE may have a reduced number of reception antennas in comparison to other UEs. For instance, a lower tier UE may have only a single receive antenna and thus a lower equivalent receive signal to noise ratio (SNR) in contrast to other UEs which may regularly have, for example, four antennae. Lower tier UEs may also have reduced computational complexity than other UEs. Examples of low-tier UEs may include, but are not limited to, smart wearable devices, industrial sensors, and video surveillance devices.

During initial access to a base station, a legacy UE first attempts to decode a physical broadcast channel (PBCH) received from a master information block (MIB) of a synchronization signal block (SSB), and identify the payload of the MIB. Based on a demodulation reference signal (DMRS) sequence and/or MIB, the UE may identify an SSB index associated with the decoded PBCH. Furthermore, based on a remaining system information (RMSI) configuration in the MIB, the UE may identify a control resource set (CORESET-0) and the related common search space (CSS). A number of aggregation levels (ALs) may be defined in association with the CORESET which identifies a number of control channel elements (CCEs) in which the UE may locate one or more PDCCH candidates. Based on the identified CORESET-0 and ALs, the UE attempts to blind decode the PDCCH candidates to identify downlink control information (DCI) in the PDCCH. The UE may then decode the DCI, which schedules at least one physical downlink shared channel (PDSCH) carrying the payload of RMSI. Upon receiving the RMSI, the UE may proceed to complete the initial access procedure.

The process for initial access would generally be the same for a low-tier UE. However, depending on the subcarrier spacing (SCS) and the number of resource blocks (RBs) configured for CORESET-0, the low-tier UE may not be able to decode PDCCH since its reception bandwidth may be lower than that of CORESET-0 in certain cases. A low-tier UE may not be able to resolve this problem by attempting to decode MIB in PBCH through multiple rounds of reception of CORESET-0, since the PDCCH candidate within a CORESET-0 received in one SSB instance may not necessarily be the same as that received in another SSB instance. Moreover, CCEs are generally interleaved across the whole frequency resource of CORESET-0 according to a fixed interleaving pattern. Therefore, if a low-tier UE only receives a single part of the CORESET-0 in a single instance, the UE may not be able to receive all the CCEs needed to decode a PDCCH candidate. Thus, there is a need to provide a low bandwidth (low-BW) CORESET-0 and associated CSS for low-tier UEs which does not exceed the reception bandwidth of the low-tier UE, and which can be interpreted from system configuration information (for example, RMSI configuration) without requiring additional signaling to legacy UEs, in order to enable coexistence between low-tier UEs and legacy UEs so that legacy UEs may continue to receive their own CORESET-0 (e.g. legacy CORESET-0).

The present disclosure allows reuse of system configuration information (for example, RMSI configuration) in the MIB to enable low-tier UEs to identify a low-BW CORESET-0 and its associated search space based on a different interpretation of the system configuration information than by legacy UEs, without requiring additional signaling for legacy UEs. A base station may configure a different structure for low-BW CORESET-0 than for legacy CORESET-0 including multiple resource grids (RGs) and CSS associated with the RGs, which the low-tier UE can identify from the system configuration information. To optimize resource utilization of the low-BW CORESET-0, the low-BW CORESET-0 may be configured to include one or more overlapping RGs with the legacy CORESET-0 which is also identified by the same system configuration information by legacy UEs. In order to provide higher AL to reduce coding rate, additional, non-overlapping RGs with legacy CORESET-0 may be time-division-multiplexed (TDM) with the one or more overlapping RGs. Low-tier UEs may be able to receive the overlapping and non-overlapping RGs and decode PDCCH candidates from a resource grid group comprised of those RGs. To prevent non-overlapping RGs from conflicting with resources which are used by other CSSs or SSBs, the RGs associated with the low-BW CORESET-0 may be continuous (or contiguous) or non-continuous (or non-contiguous) in the time domain or frequency domains.

In an aspect of the disclosure, a method, a computer-readable medium, and an apparatus are provided. The apparatus may be a UE. The apparatus identifies a low-BW CORESET and a common search space (CSS) for the low-BW CORESET based on a system configuration information in a master information block (MIB) in accordance with a SSB index received from a base station, where the identified low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and where the one or more resource grids of the low-BW CORESET comprise one or more resource element groups (REGs) or REG bundles comprised by at least one physical downlink control channel (PDCCH) candidate associated with the legacy CORESET; and the identified CSS for the low-BW CORESET further identifies at least one of a system frame number (SFN), a slot-index, or a starting-symbol to search for the frequency-time resource grids.

In another aspect of the disclosure, a method, a computer-readable medium, and an apparatus are provided. The apparatus may be a base station. The apparatus configures a low-BW CORESET and a common search space (CSS) for the low-BW CORESET based on a system configuration information in a master information block (MIB) in accordance with a SSB index transmitted to a user equipment (UE), where the configured low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and where the one or more resource grids of the low-BW CORESET comprise one or more resource element groups (REGs) or REG bundles comprised by at least one physical downlink control channel (PDCCH) candidate associated with the legacy CORESET; and the configured CSS for the low-BW CORESET further identifies at least one of a system frame number (SFN), a slot-index, or a starting-symbol to search for the frequency-time resource grids.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8A is a diagram illustrating an example low bandwidth (low-BW) CORESET-0 with an overlapping resource grid (RG) to a legacy CORESET-0.

FIG. 8B is a diagram illustrating another example low bandwidth (low-BW) CORESET-0 with an overlapping RG to a legacy CORESET-0.

FIG. 8C is a diagram illustrating another example low bandwidth (low-BW) CORESET-0 with an overlapping RG to a legacy CORESET-0.

FIG. 8D is a diagram illustrating another example low bandwidth (low-BW) CORESET-0 with an overlapping RG to a legacy CORESET-0.

FIG. 9A is a diagram illustrating an example low bandwidth (low-BW) CORESET-0 with only non-overlapping RGs with respect to a legacy CORESET-0.

FIG. 9B is a diagram illustrating another example low bandwidth (low-BW) CORESET-0 with only non-overlapping RGs with respect to a legacy CORESET-0.

FIG. 9C is a diagram illustrating another example low bandwidth (low-BW) CORESET-0 with only non-overlapping RGs with respect to a legacy CORESET-0.

FIG. 9D is a diagram illustrating another example low bandwidth (low-BW) CORESET-0 with only non-overlapping RGs with respect to a legacy CORESET-0.

DETAILED DESCRIPTION

Figure 1:
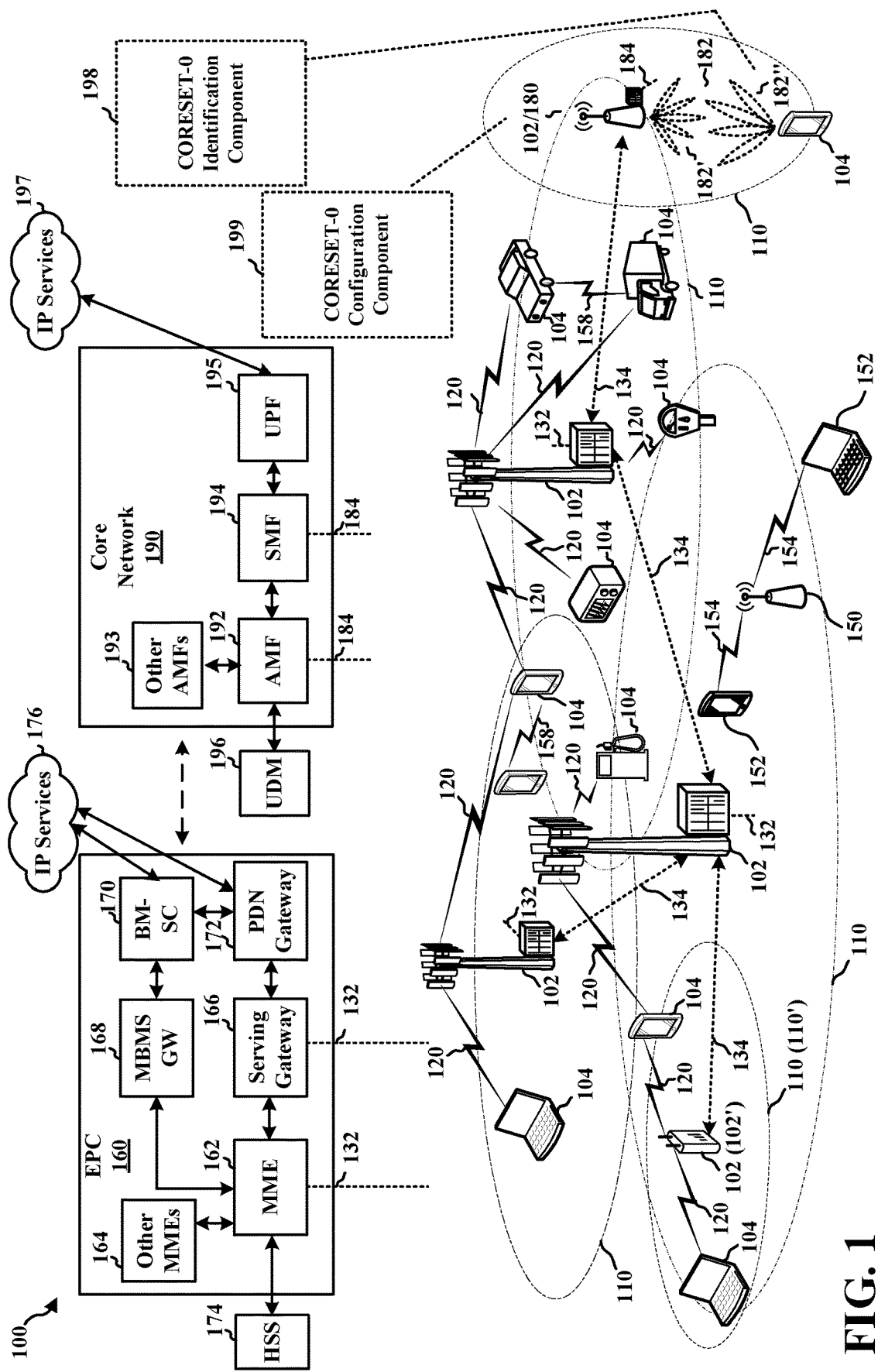
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may have a CORESET-0 identification component 198 which is configured to identify a low-BW CORESET and a common search space (CSS) for the low-BW CORESET based on a system configuration information in a master information block (MIB) in accordance with a SSB index received from a base station, where the identified low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and where the one or more resource grids of the low-BW CORESET comprise one or more resource element groups (REGs) or REG bundles comprised by at least one physical downlink control channel (PDCCH) candidate associated with the legacy CORESET; and the identified CSS for the low-BW CORESET further identifies at least one of a system frame number (SFN), a slot-index, or a starting-symbol to search for the frequency-time resource grids.

Referring still to FIG. 1, in certain aspects, the base station 102/180 may have a CORESET-0 configuration component 199 which configures a low-BW CORESET and a common search space (CSS) for the low-BW CORESET based on a system configuration information in a master information block (MIB) in accordance with a SSB index transmitted to a user equipment (UE), where the configured low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and where the one or more resource grids of the low-BW CORESET comprise one or more resource element groups (REGs) or REG bundles comprised by at least one physical downlink control channel (PDCCH) candidate associated with the legacy CORESET; and the configured CSS for the low-BW CORESET further identifies at least one of a system frame number (SFN), a slot-index, or a starting-symbol to search for the frequency-time resource grids.

Although the following description may be focused on 5G NR, the concepts described herein may be applicable to other similar areas, such as LTE, LTE-A, CDMA, GSM, and other wireless technologies.

Figure 2B:
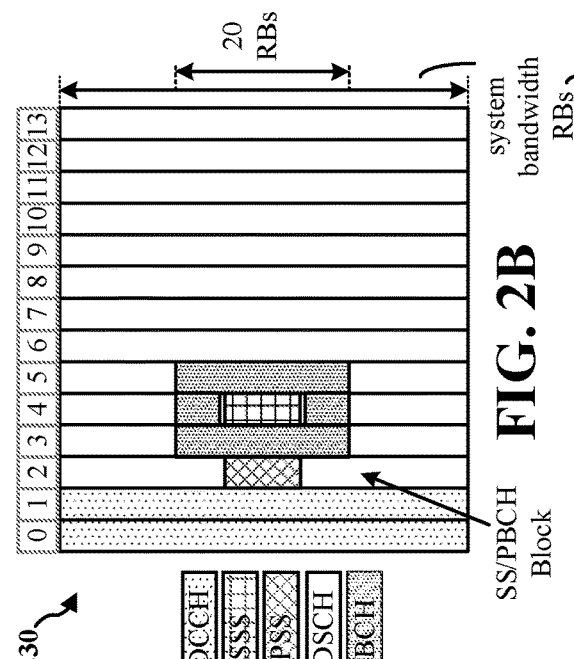
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
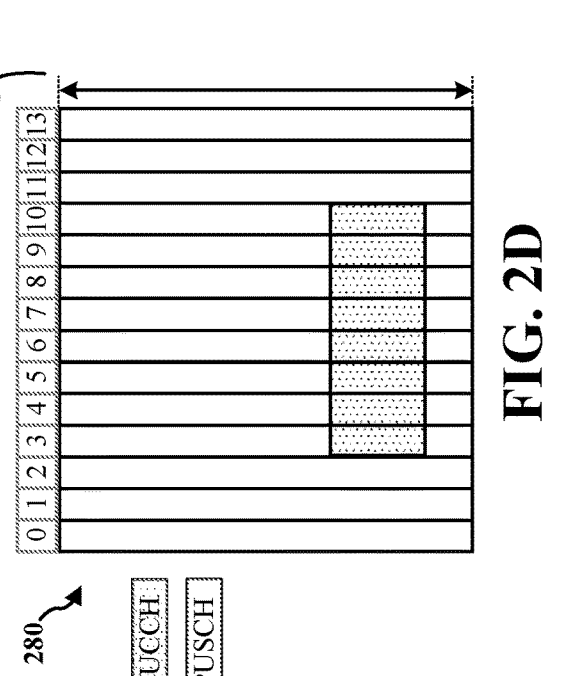
Figure 2A:
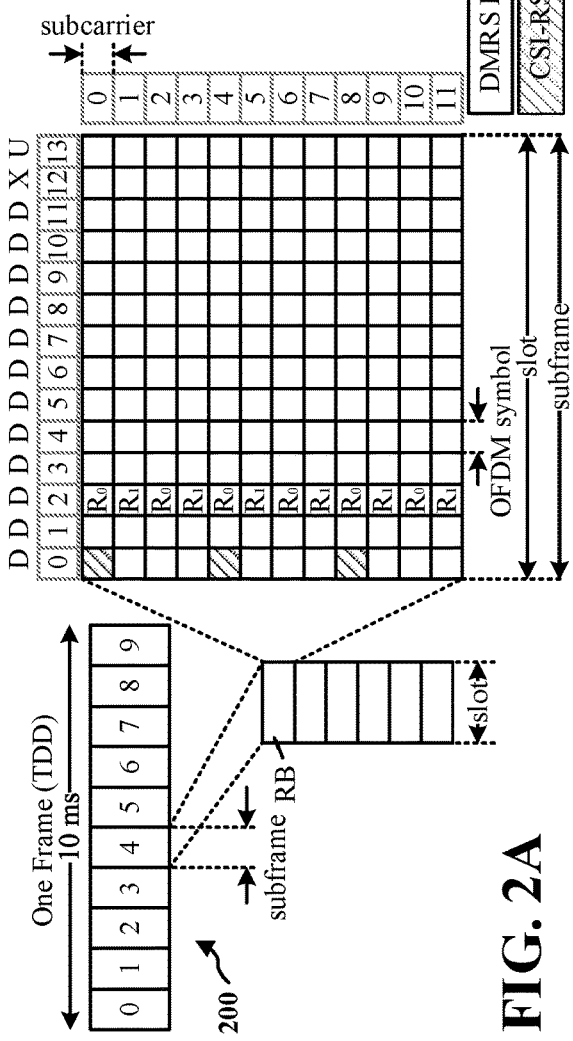
Figure 2C:
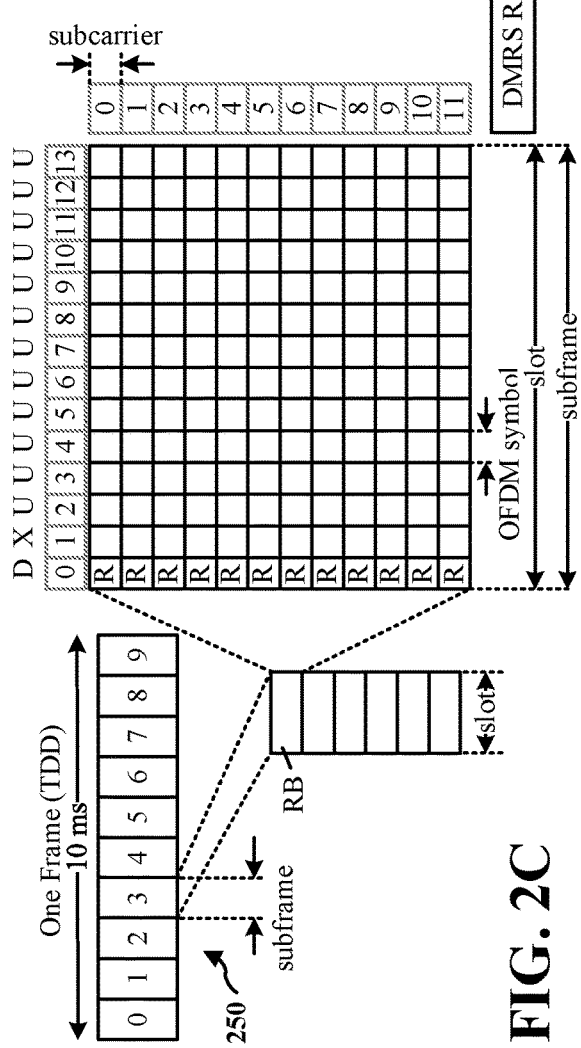

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
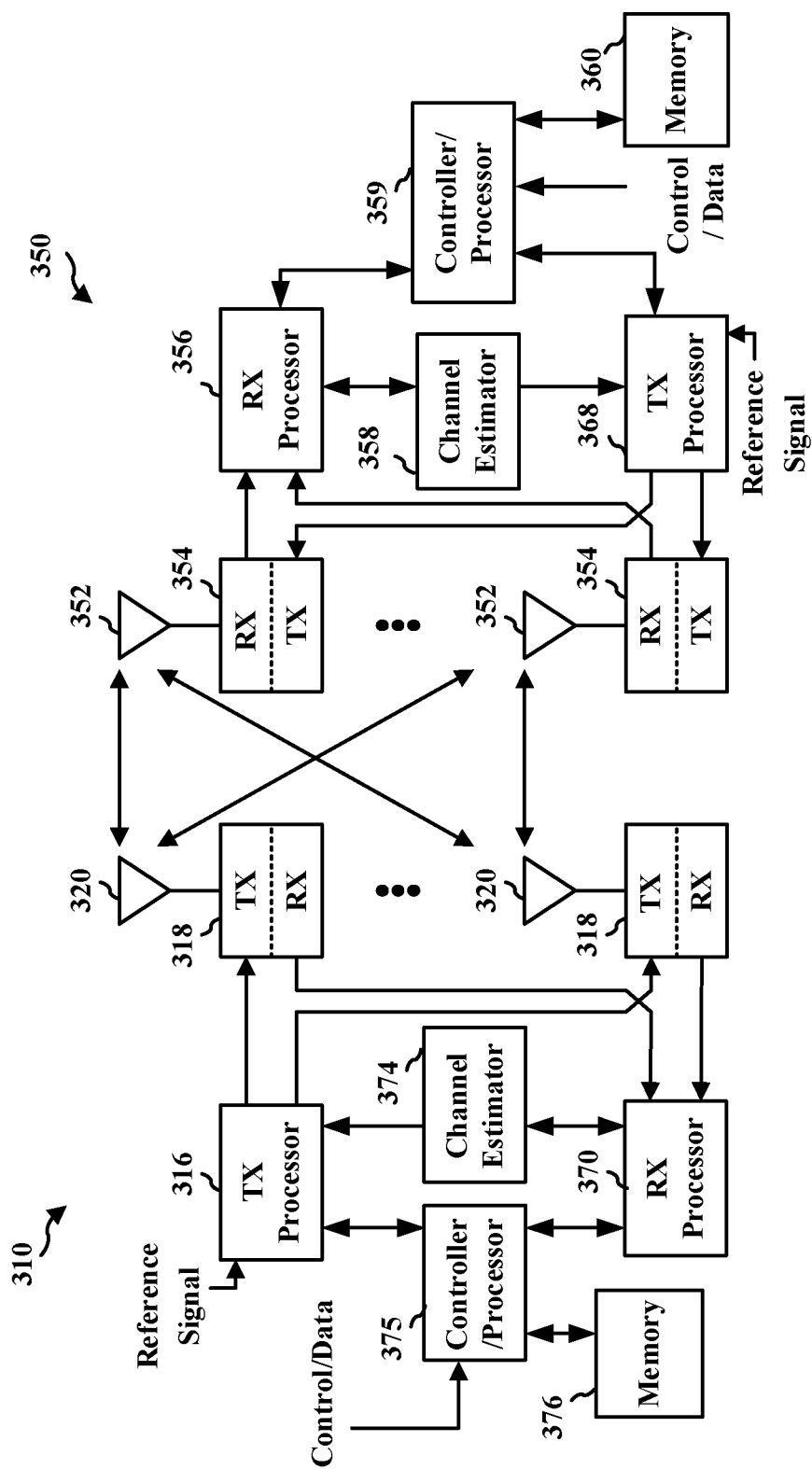
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Certain UEs (for example, NR-Light UEs or Low-Tier NR UEs) may be lower tier, or have reduced capabilities, than other UEs (e.g. legacy UEs). As an example, lower tier UEs may have reduced transmission power than legacy UEs. For instance, a lower tier UE may have a typical uplink transmission power of at least 10 dB less than that of legacy enhanced mobile broadband (eMBB) UE. As another example, lower tier UEs may have reduced transmission bandwidth or reception bandwidth than other UEs. For instance, a lower tier UE may have an operating bandwidth between 5 MHz and 10 MHz for both transmission and reception, in contrast to other UEs which may have 20-100 MHz bandwidth. As a further example, a lower tier UE may have a reduced number of reception antennas in comparison to other UEs. For instance, a lower tier UE may have only a single receive antenna and thus a lower equivalent receive signal to noise ratio (SNR) in contrast to other UEs which may regularly have, for example, four antennae. Lower tier UEs may also have reduced computational complexity than other UEs. Examples of low-tier UEs may include, but are not limited to, smart wearable devices, industrial sensors, and video surveillance devices.

Figure 4:
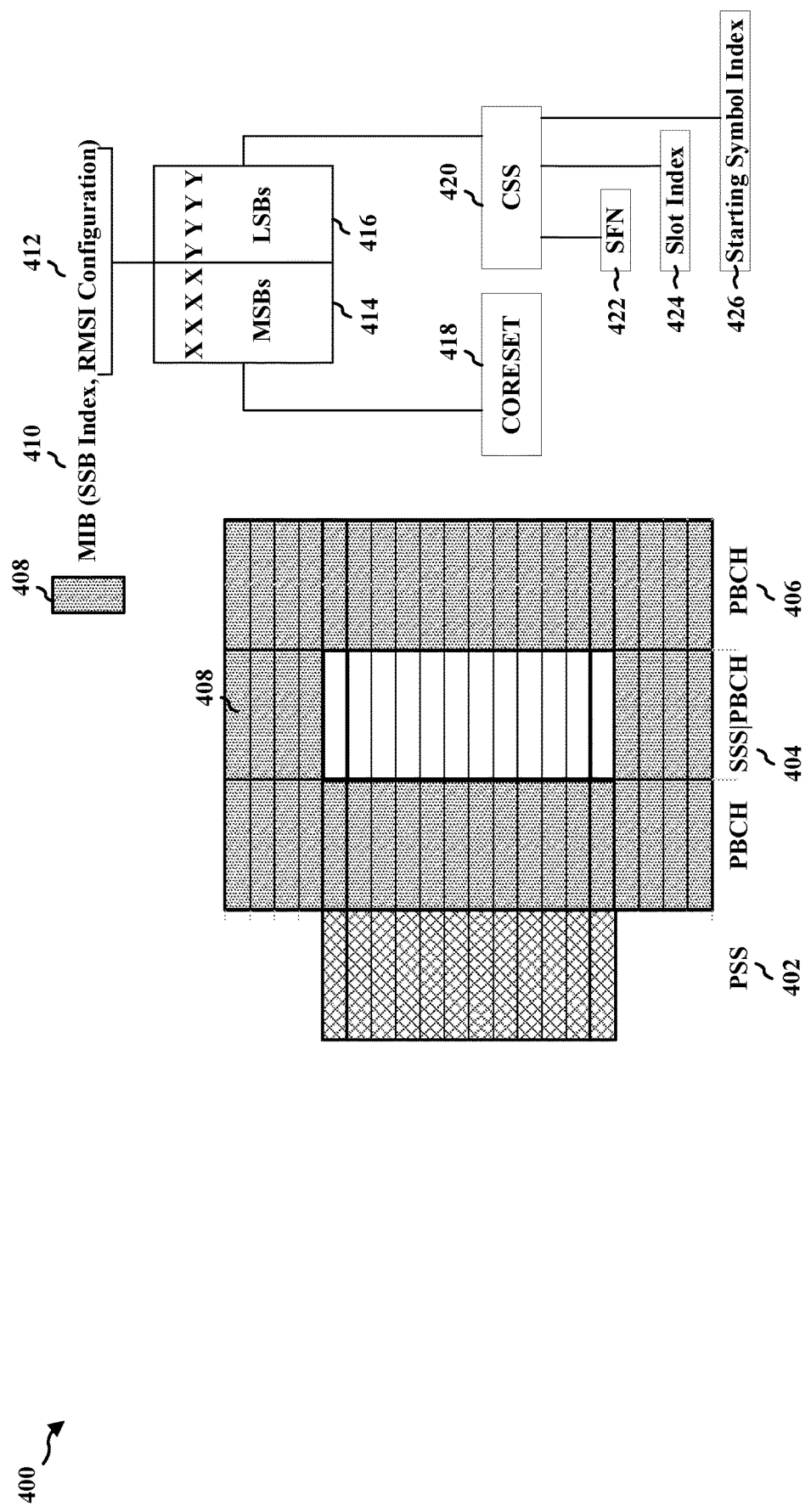
FIG. 4 is a diagram illustrating an example of a synchronization signal block (SSB).

Low-tier UEs and legacy UEs may receive synchronization signal blocks (SSBs). FIG. 4 illustrates a conceptual diagram of an SSB 400. The SSB 400 includes a primary synchronization signal (PSS) 402 and a secondary synchronization signal (SSS) 404 used for radio frame synchronization and each spanning one symbol of the SSB 400, and a physical broadcast channel (PBCH) 406 which carries a master information block (MIB) 408 and spanning two symbols of the SSB 400. The PSS, SSS, and PBCH are time-domain multiplexed (TDM) in consecutive symbols, and the SSB can be used in single and multi-beam scenarios. Moreover, the PSS and SSS in a SSB may have different subcarrier spacing (SCS) depending on the base station's operating frequency range. For example, if the operating frequency is below 6 GHz (e.g. sub-6), the SCS may be 15 kHz or 30 kHz. However, if the base station's operating frequency is above 6 GHz (e.g. above-6 or millimeter wave (mmW)), the SCS may be 120 kHz or 240 kHz.

A base station may transmit multiple SSBs within a SS burst set, each containing their own PBCH and MIB, and each corresponding to a different transmission beam from the base station during a beam sweep. While a SS burst set may have a particular periodicity (e.g. 20 ms), SSBs are generally confined within a 5 ms window in that period. The maximum number of possible candidate locations for SSBs in a 5 ms window may be defined as L, which may change depending on the base station's operating or carrier frequency range. As examples, L=4 for a carrier frequency range up to 3 GHz, L=8 for carrier frequency range from 3 GHz to 6 GHz, and L=64 for a carrier frequency range from 6 GHz to 52.6 GHz.

Figure 5A:
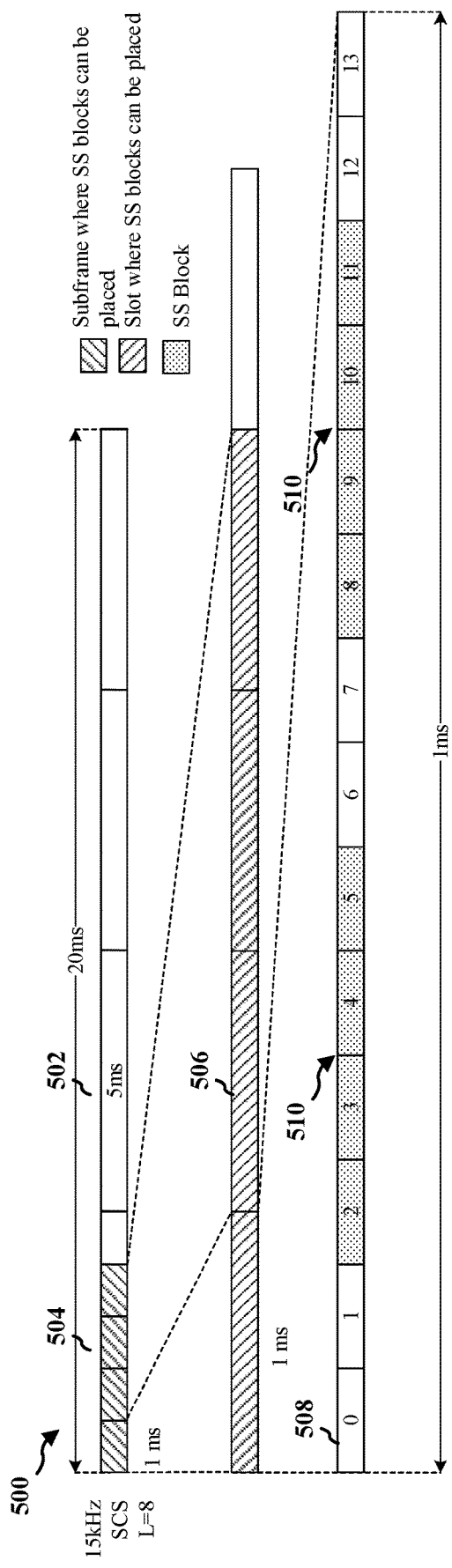
FIG. 5A is a diagram illustrating an example of SSB transmission with a 15 kHz SCS.
Figure 5B:
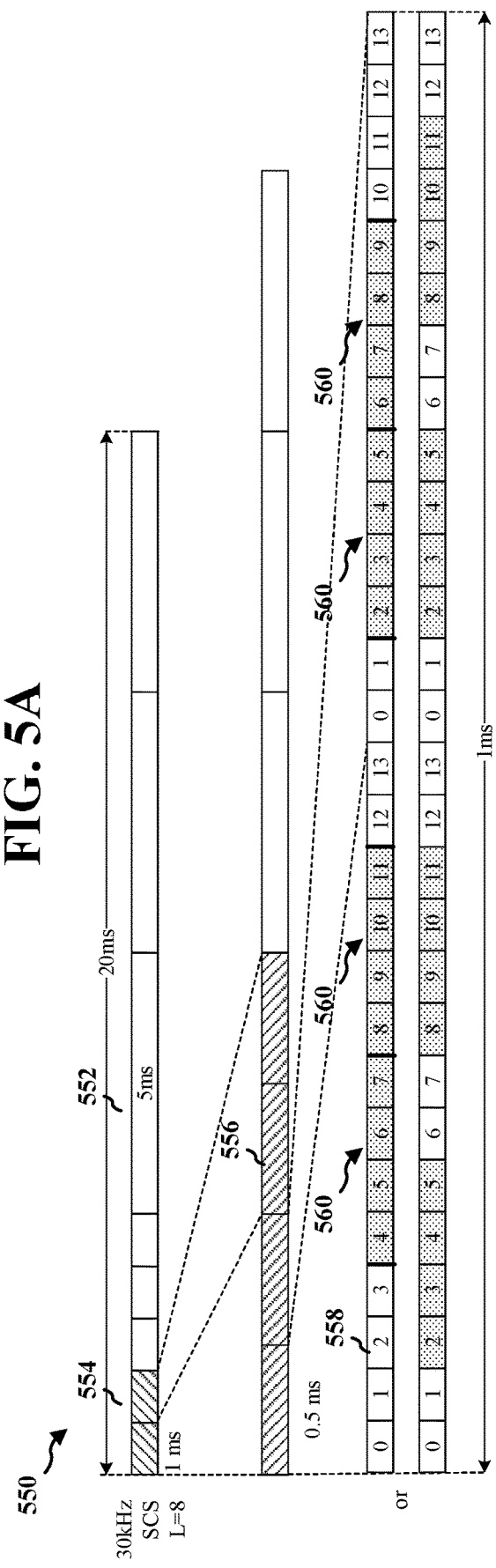
FIG. 5B is a diagram illustrating another example of SSB transmission with a 30 kHz SCS.

FIGS. 5A and 5B illustrate examples of different SSB locations and maximum values L for different SCS in the sub-6 frequency range. In particular, FIG. 5A illustrates a conceptual diagram 500 illustrating SSB locations within a 5 ms half-frame 502 at 15 kHz SCS, while FIG. 5B illustrates a conceptual diagram 550 illustrating SSB locations within a 5 ms half-frame 552 at 30 kHz SCS. Referring to FIG. 5A, for 15 kHz SCS, each subframe 504 of half-frame 502 includes one 1 ms slot 506 of fourteen OFDM symbols 508. Symbols 2-5 show one SSB 510 corresponding to one transmission beam, and symbols 8-11 show another SSB 510 corresponding to another beam. In this example, SSBs are transmitted within four subframes 504, resulting in at most 8 SSBs (L=8) in half-frame 502. Referring to FIG. 5B, for a higher 30 kHz SCS, each subframe 554 of half-frame 552 includes two 0.5 ms slots 556 each with fourteen OFDM symbols 558. In this example, the transmission of 8 SSBs 560 (L=8) occurs every 2 ms rather than the 4 ms shown in FIG. 5A. Moreover, there may be two band-specific mapping options 562 for SSBs in 30 kHz SCS as illustrated in FIG. 5B.

Figures 6A, 6B:
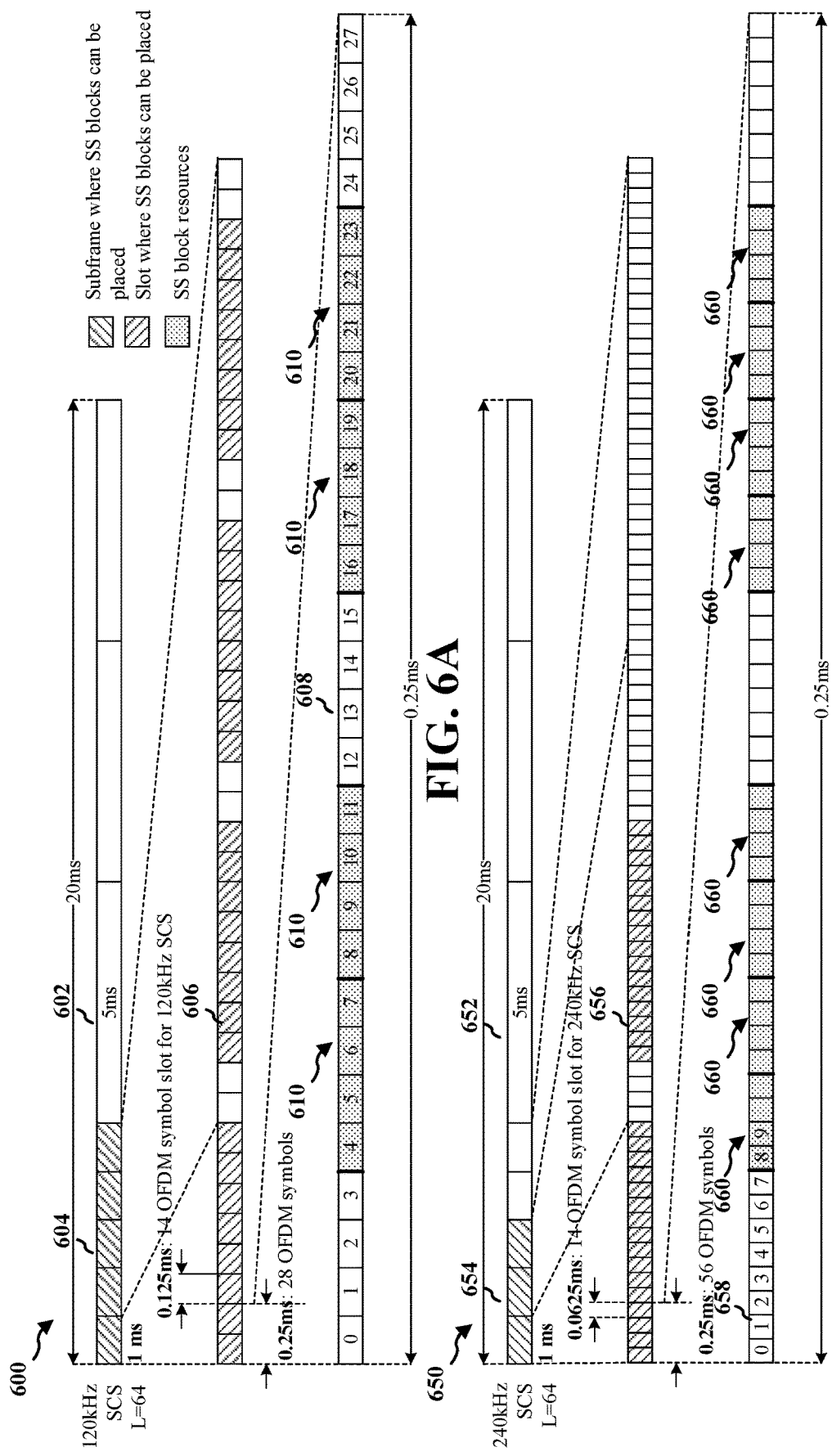
FIG. 6A is a diagram illustrating an example of SSB transmission with a 120 kHz SCS.
FIG. 6B is a diagram illustrating another example of SSB transmission with a 240 kHz SCS.

FIGS. 6A and 6B illustrate examples of different SSB locations and maximum values L for different SCS in the above-6 (mmW) frequency range. In particular, FIG. 6A illustrates a conceptual diagram 600 illustrating SSB locations within a 5 ms half-frame 602 at 120 kHz SCS, while FIG. 6B illustrates a conceptual diagram 650 illustrating SSB locations within a 5 ms half-frame 652 at 240 kHz SCS. Referring to FIG. 6A, for 120 kHz SCS, each subframe 604 of half-frame 602 includes eight 0.125 ms slot 606 of fourteen OFDM symbols 608. In this example, 4 SSBs 610 are transmitted within two slots 604, resulting in at most 64 SSBs (L=64) in half-frame 602 (corresponding to 64 transmission beams from the base station). Referring to FIG. 6B, for a higher 240 kHz SCS, each subframe 654 of half-frame 652 includes sixteen 0.0625 ms slots 656 each with fourteen OFDM symbols 658. In this example, 8 SSBs 660 are transmitted within four slots 604, resulting in at most 64 SSBs (L=64) in half-frame 602.

Referring back to FIG. 4, the PBCH 406 includes MIB 408. As illustrated in Table 1, reproduced below, the MIB may include multiple parameters altogether resulting in identical PBCH payload sizes for sub-6 and above-6 GHz frequency ranges. The parameters may include at least a system frame number (SFN), a half-frame indicator, a SSB index 410, a raster offset, a default downlink (DL) numerology, a remaining system information (RMSI) configuration 412, a front loaded demodulation reference signal (DMRS), cell barring, cell reselection, reserved bits, and a cyclic redundancy check (CRC).

TABLE 1

| PBCH payload | sub-6 (Bits) | above-6 (Bits) | Notes |
|---|---|---|---|
| SFN | 10 | 10 | Entire SFN |
| Half-frame indicator | 1 | 1 | Always conveyed explicitly. For frequencies under 3 GHz, additionally in DMRS scrambling. |
| SSB idx | 0 | 3 | 3 additional bits conveyed in DMRS scrambling. |
| Raster offset | 5 | 4 | Sync/PRB raster offset indication including possibility for different numerology. |
| Default DL numerology | 1 | 1 | 15 or 30 kHz for sub6. 60 or 120 kHz for above-6. |
| RMSI config | 8 | 8 | All RMSI CORESETs associated with SSBs within an SSB burst set have the same settings (including time duration) except time-domain location. |
| Front loaded DMRS | 1 | 1 | $2^{nd}$ or $3^{rd}$ OFDM symbol in the slot. |
| Cell barring | 1 | 1 | |
| Cell reselection | 1 | 1 | |
| Reserved | 4 | 2 | |
| CRC | 24 | 24 | Same as DCI |
| Total: | 56 | 56 | |

Two of these MIB parameters, in particular, include the SSB index 410 and the remaining system information (RMSI) configuration 412. Each SSB 400 within a SSB burst set has its own SSB index within the MIB. For sub-6 GHz frequency ranges, a UE may identify a SSB index 410 from the DMRS scrambling sequence in PBCH 406. However, in above-6 or mmW frequencies, the MIB payload includes three additional bits for the UE to identify the SSB index 410 (giving altogether 64 possibilities of SSB indices). The 3 most significant bits (MSBs) of the SSB index (or 3 reserved bits in above-6 frequencies), the 1 bit half radio frame index, and the 4 least significant bits (LSBs) of the SFN in the PBCH payload may be implemented as physical layer generated signals. The rest of the PBCH payload may be provided by an upper layer with, for example, a 80 ms transmission time interval (TTI). The PBCH contents, except the SSB index 410, is the same for all SSBs within a SSB burst set for a same center frequency.

RMSI configuration 412 is another parameter in MIB. This parameter may be composed of a number of bits including one or more MSBs 414 and one or more LSBs 416. For example, as illustrated in FIG. 4, the RMSI configuration 412 may include 8 bits in total, with four MSBs 414 and four LSBs 416. In other examples, the RMSI configuration 412 may include other numbers of bits, MSBs 414 and/or LSBs 416. For example, RMSI configuration 412 may include 5 MSBs and 3 LSBs, or vice-versa.

The one or more MSBs 414 of RMSI configuration 412 may identify a control resource set (CORESET) 418 carrying a physical downlink control channel (PDCCH), and the one or more LSBs 416 may identify a Type-0 PDCCH common search space (CSS) 420 for the CORESET 418 carrying the PDCCH. This CORESET 418 may be referred to as CORESET-0. The CORESET 418 is a set of resource grids including a number of consecutive resource blocks (RBs) and a number of OFDM symbols. The CSS 420 is associated with the identified SSB index 410, and specifies an SFN 422, a slot-index 424, and a starting-symbol-index 426 to search for the identified CORESET 418.

During initial access to the base station, the UE first attempts to decode a received PBCH 406 and identify the payload of the MIB 408. Based on the DMRS sequence and/or MIB, the UE identifies the SSB index 410 associated with the decoded PBCH 406. Furthermore, based on the RMSI configuration 412 in the MIB 408, the UE identifies the CORESET 418 (i.e. CORESET-0) and the related CSS 420 corresponding to the SSB index 410. A number of aggregation levels (ALs) (for example, three) may be defined in association with the CORESET 418 which identifies a number of control channel elements (CCE)s in which the UE may locate one or more PDCCH candidates. Based on the identified CORESET-0 and ALs, the UE attempts to blind decode the PDCCH candidates to identify downlink control information (DCI) in the PDCCH. The UE may then decode the DCI, which schedules at least one physical downlink shared channel (PDSCH) carrying the payload of RMSI. Upon receiving the RMSI, the UE may proceed to complete the initial access procedure.

The CORESET 418 may include many parameters, including a number of OFDM symbols and number of RBs, a resource element group (REG) which corresponds to one physical resource block (PRB) in one OFDM symbol (i.e. 12 subcarriers), a CCE which corresponds to 6 REGs, a CCE AL which corresponds to the number of CCEs that consist of a PDCCH candidate, a REG bundle size (e.g. including contiguous REGs in the frequency and/or time domains), and an interleaving pattern for the REG bundles (i.e. in the frequency domain). With respect to CORESET-0, which is received when the UE is attempting to initially search for a PDCCH to access the base station, the number of OFDM symbols and number of RBs are based on the one or more MSBs in RMSI configuration 412, the CCE AL candidates may be 4 (e.g. 4 PDCCH candidates), 8 (e.g. 2 PDCCH candidates), or 16 (e.g. 1 PDCCH candidate), the REG bundle size may be fixed to 6 REGs, and the interleaving pattern may be fixed (e.g. R=2). A low-tier UE with lower SNR or less reception antennae than legacy UEs may benefit from PDCCH candidates with higher AL, as those PDCCH candidates may have a lower coding rate.

Due to the interleaving pattern, the CCEs for the PDCCH candidates generally span the entire bandwidth of resources in CORESET-0. The UE must therefore be able to receive the entire CORESET to decode all the PDCCH candidates. However, a problem may arise where a low-tier UE may not be able to receive the CORESET-0. Depending on the CORESET-0's SCS and number of RBs, the CORESET-0 may have a bandwidth exceeding the low-tier UE's reception bandwidth. Table 2 illustrates different example combinations of SCS and RBs which may be possible for a CORESET-0 (where the bandwidth of the CORESET depends on the number of RBs).

TABLE 2

| Subcarrier spacing (kHz) | # of RBs | Bandwidth (MHz) |
| --- | --- | --- |
| 15 | 24, 48, 96 | 4.32, 8.64, 17.28 |
| 30 | 24, 48, 96 | 8.64, 17.28, 34.56 |
| 60 | 24, 48, 96 | 17.28, 34.56, 69.12 |
| 120 | 24, 48, 96 | 34.56, 69.12, 138.24 |

Thus, depending on the SCS and number of RBs configured for CORESET-0, the low-tier UE may not be able to decode PDCCH since its reception bandwidth may be lower than that of CORESET-0 in certain cases. For example, if the low-tier UE has a reception bandwidth of only 5 MHz, the low-tier UE may not be able to receive the entire CORESET-0 if the SCS is 15 kHz and the number of RBs is 48 or 96, since the CORESET bandwidth (8.64 or 17.28) would be larger than the 5 MHz bandwidth of the UE.

A low-tier UE may not be able to resolve this problem by attempting to decode MIB in PBCH through multiple rounds of reception of CORESET-0. For example, such UEs may not be able to simply receive part of the PDCCH associated with one SSB index and receive another part of the PDCCH associated with another SSB index. The reason is the PDCCH candidate within a CORESET-0 received in one SSB instance may not necessarily be the same as that received in another SSB instance. For example, the base station may attempt to dynamically change the location of the PDCCH resource between SSBs to provide flexibility of resource scheduling. Moreover, as described above with respect to CORESET-0 parameters, CCEs are generally interleaved across the whole frequency resource of CORESET-0 according to a fixed interleaving pattern. Therefore, if a low-tier UE only receives a single part of the CORESET-0 in a single instance, the UE may not be able to receive all the CCEs needed to decode a PDCCH candidate.

Figure 7:
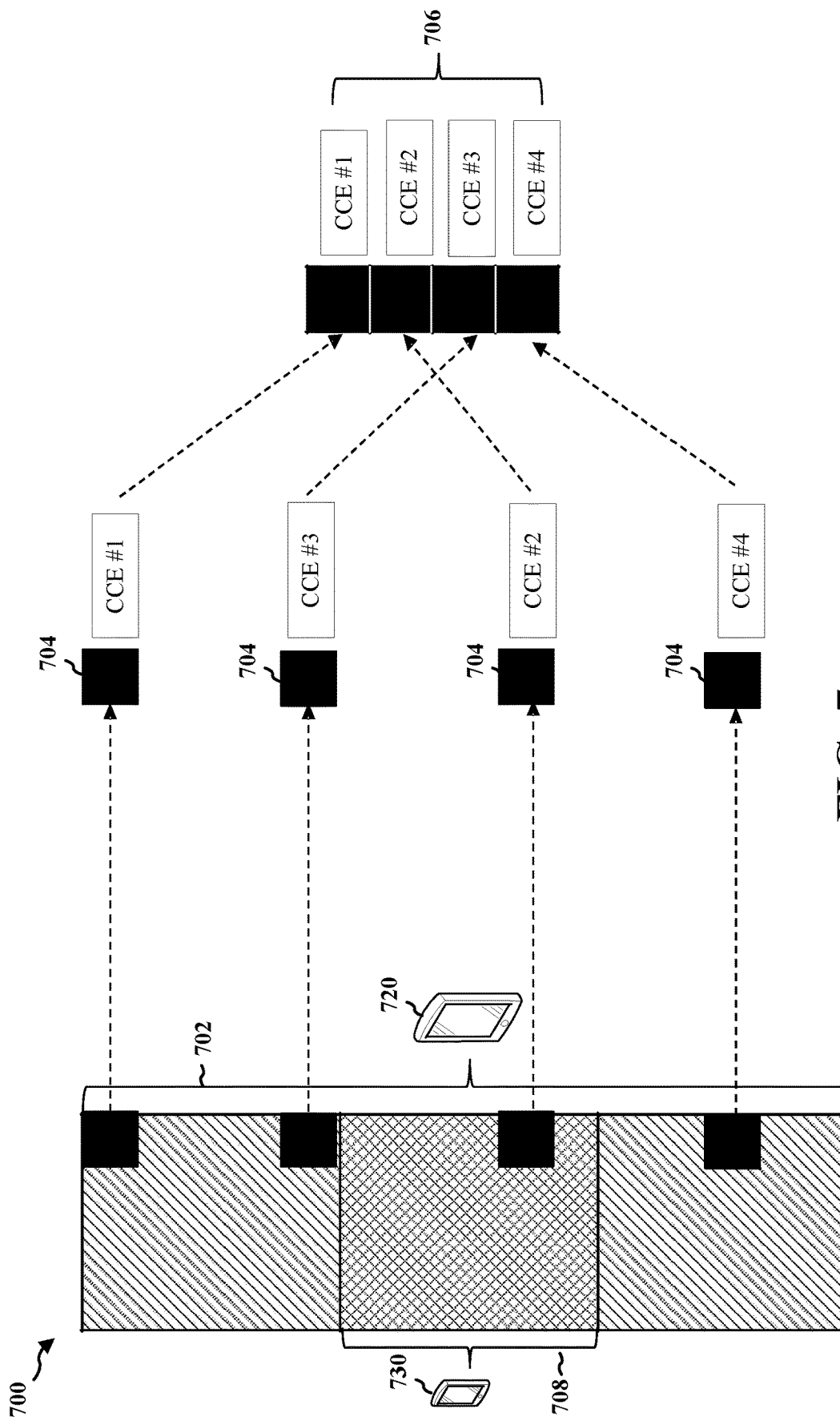
FIG. 7 is a diagram illustrating an example CORESET-0 with control channel elements (CCEs).

FIG. 7 illustrates an example diagram 700 showing a CORESET-0 702 including an interleaving pattern of CCEs 704. As shown in FIG. 7, the CCEs 704 for a certain PDCCH candidate 706 may be located across all the frequencies of CORESET-0 702 in an interleaved pattern (e.g. CCE #1, 3, 2, 4). Due to the interleaving of CCEs 704 in the CORESET-0 702, a UE 720 generally must find the CCEs 704 spanning the entire bandwidth of the CORESET-0 702, reorder them into a correct order as illustrated (e.g. CCE #1, 2, 3, 4), and decode the CCEs to identify the PDCCH. However, as a low-tier UE 730 may only be able to receive a portion of the CORESET-0 corresponding to its reception bandwidth 708, the low-tier UE 730 may be incapable of receiving all the CCEs of the CORESET that are required to decode the PDCCH. (e.g. FIG. 7 illustrates the low-tier UE 730 would only be able to receive CCE #2 in this example).

Thus, a low-tier UE would be incapable of decoding a PDCCH due to its reduced reception bandwidth. Moreover, simply implementing a new CCE mapping pattern for a PDCCH candidate within that reduced bandwidth 708 in attempt to solve the problem (e.g. placing CCEs #1-4 within reception bandwidth 708 for example) would require additional signaling to legacy UEs 720 informing them of this new pattern so they can decode their own PDCCH candidates. Thus, there is a need to provide a low bandwidth (low-BW) CORESET-0 and associated CSS for low-tier UEs which does not exceed the reception bandwidth of the low-tier UE, and which can be interpreted from system configuration information (for example, RMSI configuration) without requiring additional signaling to legacy UEs, in order to enable coexistence between low-tier UEs and legacy UEs so that legacy UEs may continue to receive their own CORESET-0 (e.g. legacy CORESET-0).

The present disclosure allows reuse of system configuration information (for example, RMSI configuration) in the MIB to enable low-tier UEs to identify a low-BW CORESET-0 and its associated search space based on a different interpretation of the system configuration information than by legacy UEs, without requiring additional signaling for legacy UEs. A base station may configure a different structure for low-BW CORESET-0 than for legacy CORESET-0 including multiple resource grids (RGs) and CSS associated with the RGs, which the low-tier UE can identify from the system configuration information. To optimize resource utilization of the low-BW CORESET-0, the low-BW CORESET-0 may be configured to include one or more overlapping RGs with the legacy CORESET-0 which is also identified by the same system configuration information by legacy UEs. In order to provide higher AL to reduce coding rate, additional, non-overlapping RGs with legacy CORESET-0 may be time-division-multiplexed (TDM) with the one or more overlapping RGs. Low-tier UEs may be able to receive the overlapping and non-overlapping RGs and decode PDCCH candidates from a resource grid group comprised of those RGs. To prevent non-overlapping RGs from conflicting with resources which are used by other CSSs or SSBs, the RGs associated with the low-BW CORESET-0 may be continuous (or contiguous) or non-continuous (or non-contiguous) in the time domain or frequency domains.

In one aspect, while a low-BW CORESET-0 may have a CORESET structure of consecutive frequency-time RGs, the low-BW CORESET-0 may also be comprised by one or more non-consecutive, or separate, frequency-time RGs. A low-tier UE may identify the frequency-time RGs of the low-BW CORESET-0 using one or more MSBs in system configuration information (for example, using 4 MSBs 414 in RMSI configuration 412). The low-BW CORESET-0 may comprise a number of RGs and a number of consecutive OFDM symbols, and each RG may be a subset of RBs (e.g. a mini-CORESET-0) of the legacy CORESET-0. For example, legacy CORESET-0 may include 96 RBs in one example, while one resource grid of low-BW CORESET-0 may only include 12 or 18 RBs (or another number) of legacy CORESET-0. The low-tier UE may identify a CSS (e.g. CSS 420) for the identified low-BW CORESET-0 from the one or more LSBs in the system configuration information (for example, using 4 LSBs 416 of the RMSI configuration 412). The CSS is associated with the SSB index (e.g. SSB index 410) and may identify the SFN (e.g. SFN 422), the slot-index within the frame associated with the SFN (e.g. slot index 424) and the starting symbol within the slot associated with slot index (e.g. starting symbol index 426).

Based on the CSS, the UE may search in the time domain for each identified RG of the low-BW CORESET-0 associated with the SSB index. The low-tier UE may identify the SSB index 410 when it receives and decodes the MIB, similar to legacy UEs.

In one aspect, the signals carried by the RGs of the low-BW CORESET-0 may be repeated over multiple SSB occasions in order to allow the low-tier UE to obtain downlink (DL) coverage enhancement. The periodicity of the repetitions may be associated with SFN indices, as described below with respect to FIG. 11. As a low-tier UE may not have as many reception antennae as legacy UEs as described above, DL signal coverage may be worse in certain situations for low-tier UEs than for legacy UEs. As a result, repetition of the signals may be used to achieve better DL coverage for low-tier UEs. Furthermore, in one aspect, the PDCCH transmission may also repeat over multiple SSB occasions in order to improve the low-tier UE's capability of receiving the PDCCH.

In one aspect, one or more RGs of the low-BW CORESET-0 and its associated CSS may be configured to overlap with a subset of resources of the legacy CORESET-0 and associated CSS. The overlapping resource grids may have the same central frequency as the legacy CORESET-0 (e.g. the overlapping RGs may overlap a central RG of the legacy CORESET-0), as illustrated for example, in FIGS. 8A-8D. Alternatively, the overlapping RGs may overlap the starting or ending RG of the legacy CORESET-0. In one option, in order to minimize the amount of extra resources of the low-BW CORESET-0 over the legacy CORESET, the RGs of low-BW CORESET-0 may be configured to substantially overlap with RGs of legacy CORESET-0. The legacy CORESET-0's overlapping RGs may be identified through the system configuration information, and the central frequency of the low-BW CORESET-0's overlapping RG may be identical to that of the legacy CORESET-0, or aligned with a first or last RB of the legacy CORESET-0.

In one aspect, each RG of the low-BW CORESET-0 may be considered a mini-CORESET of the legacy CORESET-0. For example, each resource grid of the low-BW CORESET-0 may comprise a subset of resource element group (REG) bundles of the legacy CORESET-0, where the REG bundles are consecutive within the legacy CORESET-0. In another aspect, each RG of the low-BW CORESET-0 may include a subset of CCEs of the legacy CORESET-0. For example, each resource grid of the low-BW CORESET-0 may comprise a subset of REGs or REG bundles of the legacy CORESET-0, where at least one of the REGs or REG bundles are associated with one or more CCEs, and the one or more CCEs are associated with at least one PDCCH candidate. Alternatively, the low-BW CORESET-0 and the CSS for the low-BW CORESET-0 may comprise only non-overlapping resource grids separated in time or frequency from the resource grids of the legacy CORESET-0 without any overlapping resource grids overlapping with the resource grids of the legacy CORESET-0; and at least one of a CCE interleaving pattern, a REG bundle size, and an AL of PDCCH candidates associated with the low-BW CORESET-0 are different from the legacy CORESET-0. The RGs of the low-BW CORESET-0 may be allocated based on one of the above three options, described infra.

In a first option, each non-overlapping resource grid of the low-BW CORESET-0 may be configured to contain a subset of consecutive frequency-time resources of the legacy CORESET-0. Within each RG of the low-BW CORESET-0, a certain subset of consecutive REGs or REG bundles in the legacy CORESET-0 are copied into the non-overlapping RG of the low-BW CORESET-0. In some aspects, an overlapping resource grid which reuses resources in the legacy CORESET-0 may also be configured. If all the overlapping and/or non-overlapping RGs of the low-BW CORESET-0 are combined together, a virtual CORESET-0 may be formed, and the low-tier UE can decode its CORESET-0 accordingly. FIGS. 8A and 8B illustrate conceptual diagrams 800 and 820 of this first option with an overlapping RG, while FIGS. 9A and 9B illustrate conceptual diagrams 900 and 920 of this first option without any overlapping RGs. It should be noted that while FIGS. 8A and 8B only illustrate one overlapping RG, any number of overlapping RGs may be configured.

Referring to FIG. 8A, the base station may configure the low-BW CORESET-0 802 by copying a subset of consecutive REGs or REG bundles from a legacy CORESET-0 804 into non-overlapping RGs 806 of the low-BW CORESET-0 802. While FIG. 8A illustrates a particular arrangement 803 for copying the REGs of legacy CORESET-0 804, the copying is not so limited; any subset of REGs or REG bundles of the legacy CORESET-0 804 may be copied to any non-overlapping RG 806 of low-BW CORESET-0 802. The base station configures the non-overlapping RGs 806 to have different CSS (for example, different starting symbols 808, as illustrated in FIG. 8A). The base station also configures one or more RGs of the legacy CORESET-0 804 to overlap with the low-BW CORESET-0 802 (e.g. an overlapping RG 810), and configures the CSS of the overlapping RG 810 to correspond to the CSS of the legacy CORESET-0 804. The base station also configures the non-overlapping RGs 806 to be time-division multiplexed (TDM) with the overlapping RG 810. Thus, as illustrated in FIG. 8A, the frequency resources of the RGs of low-BW CORESET-0 802 are identical (e.g. the overlapping RG 808 and non-overlapping RGs 806 all share the same frequency), and their resources are arranged consecutively in the time-domain. Moreover, the CSS of the non-overlapping RGs are different and based on continued resources.

Referring to FIG. 8B, the base station may configure the low-BW CORESET-0 822 by copying a subset of consecutive REGs or REG bundles from a legacy CORESET-0 824 into non-overlapping RGs 826 of the low-BW CORESET-0 822. Unlike FIG. 8A, the non-overlapping RGs 826 of the low-BW CORESET-0 822 may not be frequency consecutive or time consecutive, as illustrated in FIG. 8B. Moreover, while FIG. 8B illustrates a particular arrangement 823 for copying the REGs of legacy CORESET-0 824, the copying is not so limited; any subset of REGs or REG bundles of the legacy CORESET-0 824 may be copied to any non-overlapping RG 826 of low-BW CORESET-0 822. The base station configures the non-overlapping RGs 826 to have different CSS (for example, different starting symbols 828, as illustrated in FIG. 8B). The base station also configures one or more RGs of the legacy CORESET-0 824 to overlap with the low-BW CORESET-0 822 (e.g. an overlapping RG 830), and configures the CSS of the overlapping RG 830 to correspond to the CSS of the legacy CORESET-0 824. Thus, as illustrated in FIG. 8B, the resources are copied as in FIG. 8A but are not frequency consecutive or time consecutive. Moreover, while the CSS of the overlapping RGs 830 corresponds to the CSS of the legacy CORESET-0, the CSS of the non-overlapping RGs 826 are different and based on non-continued resources.

Referring to FIG. 9A, the base station may configure the low-BW CORESET-0 902 by copying a subset of consecutive REGs or REG bundles from a legacy CORESET-0 904 into non-overlapping RGs 906 of the low-BW CORESET-0

902. While FIG. 9A illustrates a particular arrangement 903 for copying the REGs of legacy CORESET-0 904, the copying is not so limited; any subset of REGs or REG bundles of the legacy CORESET-0 904 may be copied to any non-overlapping RG 906 of low-BW CORESET-0 902. The base station configures the non-overlapping RGs 906 to have different CSS (for example, different starting symbols 908, as illustrated in FIG. 9A). However, unlike FIG. 8A, in this example the base station does not configure any overlapping RGs with that of the legacy CORESET-0 904. Thus, as illustrated in FIG. 9A, all the RGs of the low-BW CORESET-0 are non-overlapping with different CSS based on continued resources.

Referring to FIG. 9B, the base station may configure the low-BW CORESET-0 922 by copying a subset of consecutive REGs or REG bundles from a legacy CORESET-0 924 into non-overlapping RGs 926 of the low-BW CORESET-0 922. Unlike FIG. 9A, the non-overlapping RGs 926 of the low-BW CORESET-0 922 may not be frequency consecutive or time consecutive, as illustrated in FIG. 9B. Moreover, while FIG. 9B illustrates a particular arrangement 923 for copying the REGs of legacy CORESET-0 924, the copying is not so limited; any subset of REGs or REG bundles of the legacy CORESET-0 924 may be copied to any non-overlapping RG 926 of low-BW CORESET-0 922. The base station configures the non-overlapping RGs 926 to have different CSS (for example, different starting symbols 928, as illustrated in FIG. 9B). However, unlike FIG. 8B, in this example the base station does not configure any overlapping RGs with that of the legacy CORESET-0 924. Thus, as illustrated in FIG. 9B, all the RGs of the low-BW CORESET-0 are non-overlapping with different CSS based on non-continued resources.

In one example, a low-tier UE or a legacy UE may read the bits in the system configuration information (for example, 8 bits in RMSI configuration). If a legacy UE is reading the one or more MSBs, the legacy UE would interpret its CORESET-0 and search space as corresponding to either the legacy CORESET-0 804, 824, 904, or 924, depending on the configuration by the base station. However, if a low-tier UE is reading the one or more MSBs, the low-tier UE would interpret its CORESET-0 and search space as corresponding to either the low-BW CORESET-0 802, 822, 902, or 922, depending on the configuration by the base station, with a configured number of RGs and its own frequency (location of RGs) and time domain (number of symbols) resource identification. The one or more MSBs may identify to the UE where any overlapping and non-overlapping resources are located in the frequency domain and the number of OFDM symbols that each RG has. From the one or more LSBs, the low-tier UE may identify where it can respectively identify the configured RGs. The one or more LSBs may identify the time domain location where the non-overlapping RGs (and overlapping RGs) can be searched. The low-tier UE may thus identify the low-BW CORESET-0's resource grids and identify the CSS.

In one aspect, the one or more MSBs of the system configuration information may be different between the examples of FIGS. 8A/9A and FIGS. 8B/9B described above. For example, if continued resources are used as in FIG. 8A or 9A, the one or more MSBs may have a value of '0' or some other number, while if non-continued resources are used as in FIG. 8B or 9B, the one or more MSBs may have a different value to signify the different frequency locations. Furthermore, if RGs are allocated or configured to be continuous in the time domain while occupying the same frequency domain location (e.g. as in FIGS. 8A and 9A), the one or more MSBs may have the same value among the different RGs, while the one or more LSBs may have different values to identify where in time the RGs can be found.

In a second option, rather than copying a subset of consecutive REGs or REG bundles from the legacy CORESET-0 into the low-BW CORESET-0 as in the first option, only selected subset of REGs or REG bundles of a legacy CORESET-0 which are associated with CCEs comprised by at least one PDCCH candidate are copied into the non-overlapping RGs of the low-BW CORESET-0. Thus, a different CCE interleaving pattern and different PDCCH decoding candidates from legacy CORESET-0 may be identified in the non-overlapping RGs. For example, if the legacy CORESET-0 has an AL of 8 (e.g. eight CCEs) with two candidates, only one candidate or an AL of 4 (e.g. four CCEs) may be configured to be mapped to the non-overlapping RGs of the low-BW CORESET-0. While reducing candidates or AL may increase the coding rate, repetitions as described above may be used to compensate for the lowered AL. In this way, the number of extra, non-overlapping RGs for low-BW CORESET-0 in comparison to legacy CORESET-0 may be reduced in contrast to the aforementioned examples of FIGS. 8A, 8B, 9A, and 9D, since all the CCEs in the legacy CORESET-0 may not need to be mapped into the non-overlapping RGs of the low-BW CORESET-0.

FIGS. 8C and 8D illustrate conceptual diagrams 850 and 870 of this second option with an overlapping RG, while FIGS. 9C and 9D illustrate conceptual diagrams 950 and 970 of this second option without any overlapping RGs. It should be noted that while FIGS. 8C and 8D only illustrate one overlapping RG, any number of overlapping RGs may be configured.

Referring to FIG. 8C, the base station may configure the low-BW CORESET-0 852 by mapping REGs or REG bundles from a legacy CORESET-0 854 which are associated with CCEs comprised by at least one PDCCH candidate into non-overlapping RGs 856 of the low-BW CORESET-0 852. While FIG. 8C illustrates possible arrangements 853 for mapping the REGs or REG bundles of legacy CORESET-0 854, the mappings are not so limited; any REGs or REG bundles of the legacy CORESET-0 854 which are associated with CCEs comprised by at least one PDCCH candidate may be mapped to any non-overlapping RG 856 of low-BW CORESET-0 852. The base station configures the non-overlapping RGs 806 to have different CSS (for example, different starting symbols 858, as illustrated in FIG. 8C). The base station also configures one or more RGs of the legacy CORESET-0 854 to overlap with the low-BW CORESET-0 852 (e.g. an overlapping RG 860), and configures the CSS of the overlapping RG 860 to correspond to the CSS of the legacy CORESET-0 854. The base station also configures the non-overlapping RGs 856 to be time-division multiplexed (TDM) with the overlapping RG 860. Thus, as illustrated in FIG. 8C, only selected REGs or REG bundles associated with CCEs in the legacy CORESET-0 852 are mapped to non-overlapping RGs 856. As a result, the number of PDCCH candidates or ALs to decode may be reduced in comparison to the examples of FIGS. 8A and 8B. The CSS of the overlapping RG 860 corresponds to the CSS of the legacy CORESET-0 854.

Referring to FIG. 8D, the base station may configure the low-BW CORESET-0 872 by mapping REGs or REG bundles from a legacy CORESET-0 874 which are associated with CCEs comprised by at least one PDCCH candidate into non-overlapping RGs 876 of the low-BW CORESET-0 872. Unlike FIG. 8C, the non-overlapping RGs 876 of the low-BW CORESET-0 872 may not be frequency consecutive or time consecutive, as illustrated in FIG. 8D. Moreover, while FIG. 8D illustrates possible arrangements 873 for mapping the REGs or REG bundles of legacy CORESET-0 874, the mappings are not so limited; any REGs or REG bundles of the legacy CORESET-0 874 which are associated with CCEs comprised by at least one PDCCH candidate may be mapped to any non-overlapping RG 876 of low-BW CORESET-0 872 in any order. The base station configures the non-overlapping RGs 876 to have different CSS (for example, different starting symbols 878, as illustrated in FIG. 8D). The base station also configures one or more RGs of the legacy CORESET-0 874 to overlap with the low-BW CORESET-0 872 (e.g. an overlapping RG 880), and configures the CSS of the overlapping RG 880 to correspond to the CSS of the legacy CORESET-0 874. Thus, as illustrated in FIG. 8D, the selected REGs or REG bundles associated with CCEs are mapped as in FIG. 8C but are not frequency consecutive or time consecutive. The CSS of the one or more overlapping RGs corresponds to the CSS of the legacy CORESET-0.

Referring to FIG. 9C, the base station may configure the low-BW CORESET-0 952 by mapping REGs or REG bundles from a legacy CORESET-0 954 which are associated with CCEs comprised by at least one PDCCH candidate into non-overlapping RGs 956 of the low-BW CORESET-0 952. While FIG. 9C illustrates possible arrangements 953 for mapping the REGs or REG bundles of legacy CORESET-0 954, the mappings are not so limited; any REGs or REG bundles of the legacy CORESET-0 954 which are associated with CCEs comprised by at least one PDCCH candidate may be mapped to any RG 956 of low-BW CORESET-0 952. The base station configures the non-overlapping RGs 956 to have different CSS (for example, different starting symbols 958, as illustrated in FIG. 9C). However, unlike FIG. 8C, in this example the base station does not configure any overlapping RGs with that of the legacy CORESET-0 954. Thus, as illustrated in FIG. 9C, all the RGs of the low-BW CORESET-0 are non-overlapping with different CSS based on continued resources.

Referring to FIG. 9D, the base station may configure the low-BW CORESET-0 972 by mapping REGs or REG bundles from a legacy CORESET-0 974 which are associated with CCEs comprised by at least one PDCCH candidate into non-overlapping RGs 976 of the low-BW CORESET-0 972. Unlike FIG. 9C, the non-overlapping RGs 976 of the low-BW CORESET-0 972 may not be frequency consecutive or time consecutive, as illustrated in FIG. 9D. Moreover, while FIG. 9D illustrates possible arrangements 973 for mapping the REGs or REG bundles of legacy CORESET-0 974, the mappings are not so limited; any REGs or REG bundles of the legacy CORESET-0 974 which are associated with CCEs comprised by at least one PDCCH candidate may be mapped to any RG 976 of low-BW CORESET-0 972 in any order. The base station configures the non-overlapping RGs 976 to have different CSS (for example, different starting symbols 978, as illustrated in FIG. 9D). However, unlike FIG. 8D, in this example the base station does not configure any overlapping RGs with that of the legacy CORESET-0 974. Thus, as illustrated in FIG. 9D, all the RGs of the low-BW CORESET-0 are non-overlapping with different CSS based on non-continued resources.

Thus, in this second option, the complete set of REGs or REG bundles in the legacy CORESET-0 are not mapped into various RGs as in the first option, rather only the REGs associated with CCEs may be mapped into the non-overlapping RGs of the low-BW CORESET-0 (and arranged in a different combination than in legacy CORESET-0). In this way, the number of extra, non-overlapping RGs can be reduced in comparison to the first option. The REGs may be allocated based on an allocation rule associated with the identified low-BW CORESET-0, and the location to search for the low-BW CORESET-0 may be identified in the CSS based on the one or more LSBs in the system configuration information. The one or more MSBs in the system configuration information may identify to the UE how the REGs associated with the CCEs are mapped to the RGs. Depending on which option is configured by the base station (both options may be cell-specific configurations), low-tier UEs may interpret the one or more MSBs based on either option.

In a third option, the base station may not configure any overlapping resources for low-tier UEs. Thus, as there are only non-overlapping RGs, the base station does not need to copy a subset of consecutive REGs or REG bundles of a legacy-CORESET-0, or a subset of REGs/REG bundles which are associated with CCEs comprised by at least one PDCCH candidate, into the low-BW CORESET-0. Thus, the base station may configure new parameters for the low-BW CORESET-0 in this option. The CCE pattern for the low-BW CORESET-0 can be configured differently than in the first two options, and the number of extra RGs (non-overlapping RGs) can be minimized.

Figure 10:
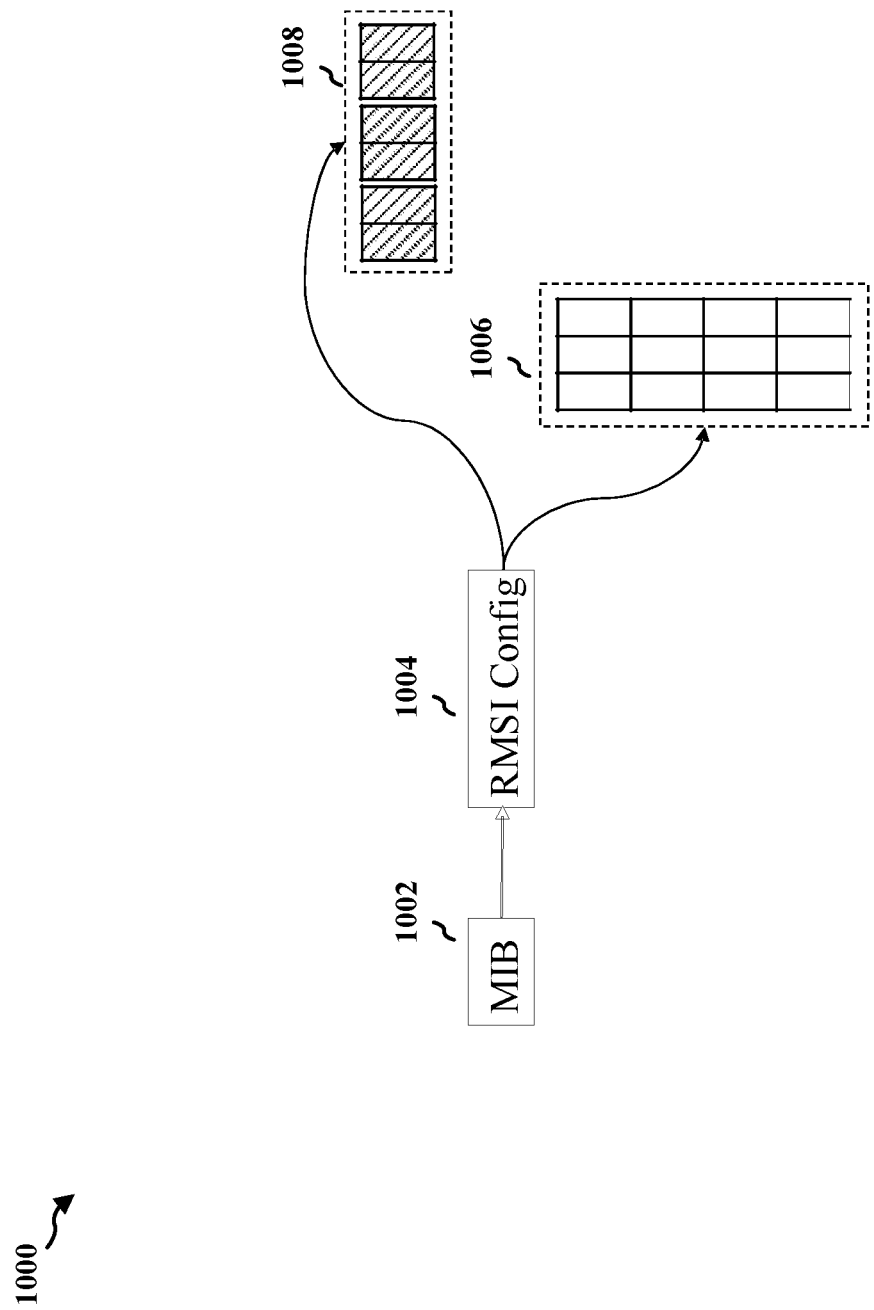
FIG. 10 is a diagram illustrating another example low-BW CORESET-0 independent from a legacy CORESET-0.

FIG. 10 illustrates a conceptual diagram 1000 of an example where low-BW CORESET-0 and legacy CORESET-0 are independent of each other. As described above, a UE may receive a MIB 1002 including RMSI configuration 1004 or other system configuration information. If the UE is a legacy UE, the UE may identify the legacy CORESET-0 1006 and associated CSS as described above with respect to FIG. 4. However, if the UE is a low-tier UE, after receiving the RMSI configuration 1004, the UE may interpret the frequency-time location and CSS of a low-BW CORESET-0 1008 from the RMSI configuration 1004 differently from legacy UEs based on the UE's configuration (for example, its reception bandwidth). All the parameters associated with the low-BW CORESET-0 1008 (e.g. a CCE interleaving pattern, a REG bundle size, an AL of PDCCH candidates, etc.) may be configured by the base station to be different than for a legacy CORESET-0 1006.

Thus, in this option, a low-tier UE may only identify the frequency, time and number of symbols within each RG of the low-BW CORESET-0 and the associated search space from the system configuration information. However, within each RG, the base station does not copy a subset of REGs/REG bundles of the legacy CORESET-0 which are associated with certain CCEs into the extra, non-overlapping RGs of the low-BW CORESET-0, but can configure new parameters for those RGs. As described above, in the first and second options shown in the examples above of FIGS. 8A-9D, the base station may map certain subsets of REGs or REG bundles of legacy CORESET-0 into the RGs of the low-BW CORESET-0 (either overlapping or extra, non-overlapping RGs). However, in the third option as described with respect to FIG. 10, the base station does not copy resources from the legacy CORESET-0 into the extra RGs of the low-BW CORESET-0, allowing the parameters of the low-BW CORESET-0 to be redesigned. Additionally, legacy UEs may continue to interpret their legacy CORESET-0 from the system configuration information without knowledge of the low-BW CORESET-0, and low-tier UEs may interpret their low-BW CORESET-0 without depending on the legacy CORESET-0 and its CCEs. The low-tier UE may accordingly identify the PDCCH based on the system configuration information.

In other aspects, a low-BW CORESET-0 may be repeated to enhance DL signal coverage for low-tier UEs. Each repetition of the low-BW CORESET-0 may be associated with a SFN which the low-tier UE identifies from the MIB. The time-frequency location of the low-BW CORESET-0 may be identical over different SSB occasions. While legacy CORESET-0s may have different PDCCH candidates (e.g. PDCCH payload information) varying across different SSB occasions, the base station may configure low-BW CORESET-0 to repeat a certain number of times in association with the SFN corresponding to the current SSB instance. Thus, low-tier UEs may combine the low-BW CORESET-0 repetitions and obtain DL signal coverage enhancement.

Figure 11:
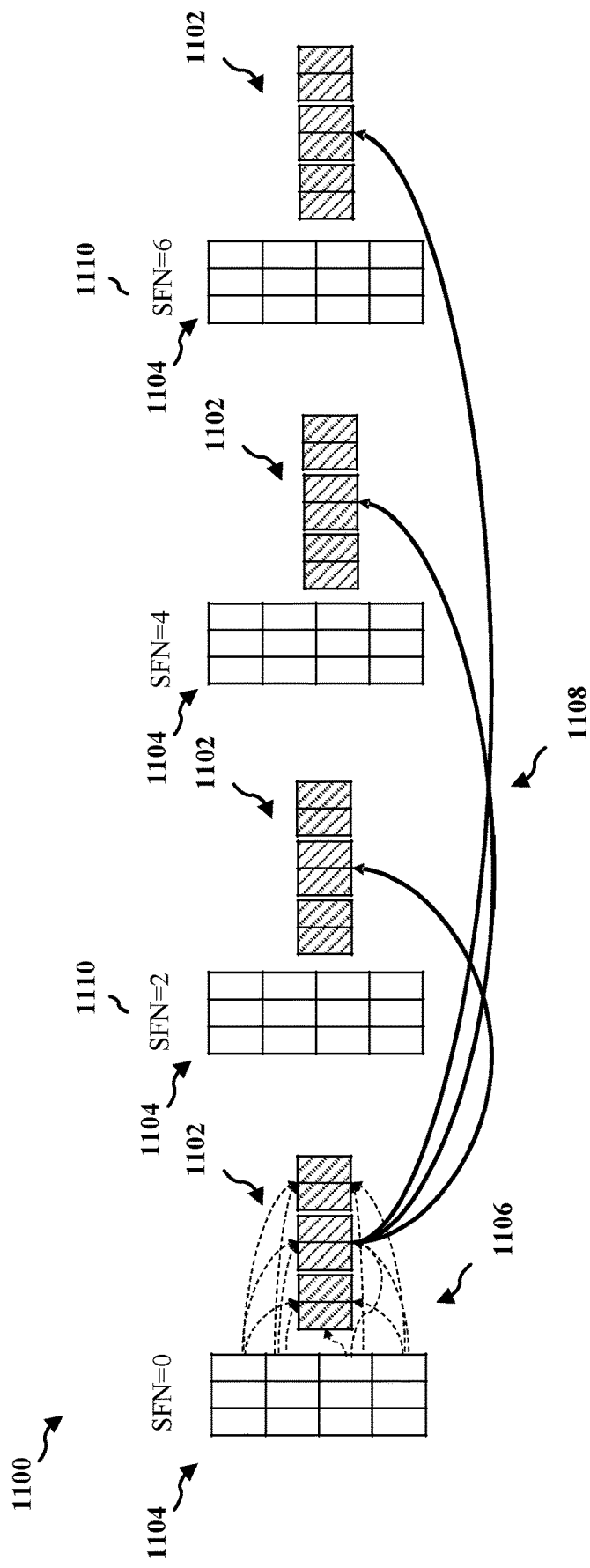
FIG. 11 is a diagram illustrating an example of PDCCH repetition in the example of FIG. 9C.

FIG. 11 illustrates an example diagram 1100 of a repetition pattern for the low-BW CORESET-0 in the example of FIG. 9C. As described above, the base station may configure a low-BW CORESET-0 1102 by mapping REGs or REG bundles which are associated with CCEs comprised by at least one PDCCH candidate from a legacy CORESET-0 1104 into non-overlapping RGs of the low-BW CORESET-0 1102 based on multiple possibilities of arrangements 1106. However, in this example, the base station has configured the low-BW CORESET-0 1102 to be repeated a certain number of times according to a repetition pattern 1108 in order to improve low-tier UE DL signal coverage. The base station has also configured the low-BW CORESET-0 1102 to repeat at certain system frame numbers (SFN) 1110. For example, FIG. 11 illustrates low-BW CORESET-0 1102 being repeated four times when the SFN 1110 is 0, 2, 4, and 6, although any number of repetitions and/or SFNs may be configured. When the low-tier UE receives the MIB, the low-tier UE may determine the SFN based on the MIB in addition to the SSB index and RMSI configuration. Thus, the UE may receive repeated PDCCHs in the low-BW CORESET-0 1102. The base station may not repeat PDCCH for legacy CORESET-0 1104, which may instead vary across SSBs as discussed above.

In one aspect, the repetition pattern comprises the CSS of the low-BW CORESET-0 associated with a first SSB index comprising a repeated low-BW CORESET-0 associated with the first SSB index across multiple SS burst periodicities. An example of this repetition pattern is described above, for example, with respect to FIG. 11, where the repeated PDCCHs are associated with one SSB index. In another aspect, the repetition pattern comprises the CSS of the low-BW CORESET-0 associated with a first SSB index comprising a repeated low-BW CORESET-0 associated with the first SSB index during a first SS burst periodicity, and the CSS of the low-BW CORESET-0 associated with a second SSB index comprising a repeated low-BW CORESET-0 associated with the second SSB index during a second SS burst periodicity. For example, a PDCCH for a first SSB index may be repeated in the first 20 ms of a SS burst set periodicity, while a PDCCH for a second SSB index may repeated in the next 20 ms, and so forth. Thus, repeated PDCCHs may be associated with multiple SSB indices.

In other aspects, a low-tier UE may have the capability to decode legacy CORESET-0 if its bandwidth is lower than the reception bandwidth of the UE. The UE may determine whether to identify the system configuration information associated with a legacy CORESET-0 and CSS, or a low-BW CORESET-0 and CSS, based on the identified legacy CORESET-0 bandwidth associated with an identified SCS. If the identified legacy CORESET-0 bandwidth is lower than the low-tier UE's reception bandwidth, the legacy CORESET-0 is interpreted from the system configuration information. Otherwise, the low-BW CORESET-0 is interpreted from the system configuration information.

In another aspect, the number of low-BW CORESET-0 repetitions may be minimized across multiple SSB occasions such that the repetition gain to the low-tier UE can meet the low-tier UE's requirement based on its link budget. If repetition across SSB occasions is configured as described above in FIG. 11 for example, resource utilization may be inefficient if the number of repetitions is too high. Therefore, the base station may minimize the number of repetitions by ensuring the achievement of DL coverage enhancement through repetition meets by the UE's requirement based on its link budget.

In another aspect, the CCE numbering in the low-BW CORESET-0 may be reversed with respect to the CCEs of the legacy CORESET-0. For example, the CCEs may be mapped starting from the last CCE towards the first CCE of the legacy CORESET-0. This reversed mapping arrangement may reduce the number of additional, non-overlapping RGs since reserved CCEs may be numbered as the last CCEs for a legacy CORESET-0. For example, in some cases the last-numbered CCEs may be reserved (e.g. unused), and so mapping those reserved CCEs may allow the total number of CCEs of the low-tier UE to be lower than the original number of CCEs within the legacy CORESET-0.

In a further aspect, the determination of the overlapping RGs' location may be a function of the identified search space (CSS) or legacy CORESET-0's configuration. For example, the indices of the overlapping RGs may be a function of the identified SFN, slot-index or starting-symbol of the overlapping legacy CSS or CORESET-0. These overlapping RGs may be identified through the legacy search space.

In other aspects pertaining to the location of RGs, the bandwidth of the low-BW CORESET-0 may be lower than the reception bandwidth of the low-tier UE. Thus, each RG of a low-BW CORESET-0 may have a frequency span lower than that of the operational bandwidth of the low-tier UE.

In another aspect, the resources of the low-BW CORESET-0 may be separately located from the resources used by the associated SSB for initial access. Thus, the frequency-time resources of the identified RGs and their associated CSS may be configured to avoid the frequency-time resources used by the associated SSB for initial access. The associated SSB may be identified by the SSB index determined by the same MIB/PBCH received by the UE for initial access.

In a further aspect, the CSS of the extra, non-overlapping RGs may be placed as close as possible to the RGs of the legacy CSS in the time domain. The legacy CSS may be identified using the system configuration information (e.g. RMSI config). In one aspect the CSS of the non-overlapping RGs may be within the same slot containing the legacy CSS. In an alternative aspect, the CSS of the non-overlapping RGs may be within slots as close as possible to the slots containing the legacy CSS.

The non-overlapping RGs and associated CSS may also consider potentially additional SSBs other than initial access SSBs. For example, in some cases the actual SSB periodicity may be extended to 5 ms due to the need for radio resource management (RRM) measurements (e.g. link quality measurements when the UE is RRC connected), rather than the default 20 ms SSB periodicity configured for initial access. In such case, every slot may contain SSBs. Thus in some aspects, the RGs and associated CSS may be configured based on the location of the potentially additional SSBs in order to avoid conflicts in using the resources occupied by these SSBs.

In another aspect, frequency switch may be minimized. For example, the central frequency switch of a low-tier UE may be configured to be minimized between one low-BW CSS to another low-BW CSS, one low-BW CSS to a SSB, and a SSB to a low-BW CSS. However, different RGs may not have consecutive frequencies, and sometimes those RGs may not have the same central frequency as a SSB. If such minimization is beyond the low-tier UE's capabilities (i.e. frequency switch must be encountered), additional guard time symbols or time domain resources may be placed between the two low-BW RGs and/or SSB to allow the low-tier UE time to prepare for the frequency switch (e.g. to retune to a central frequency for receiving the signal). For instance, a low-tier UE may frequency switch from the first 5 MHz to the second 5 MHz within a total 10 MHz bandwidth for the low-BW CORESET-0 if the UE's reception bandwidth is only 5 MHz. In such case, for example as shown in FIGS. 8B, 8D, 9B, and 9D, the UE may frequency switch between different non-overlapping RGs. However, if the low-tier UE has only a reception bandwidth of one RG, the UE may have to retune its RF central frequency to read the second RG (which may take additional time based on UE capability). The UE may similarly have to retune its central frequency if it switches between a RG to a SSB or vice-versa.

In an additional aspect, the UE may use reserved bits (or bit points) in the system configuration information to identify its low-BW CORESET-0. For example, where RMSI configuration in MIB includes one or more reserved bits, the base station may configure those reserved bits to allow the low-tier UE to identify its low-BW CORESET-0 and CSS from the reserved bits.

In a further aspect, the identified low-BW CORESET and the CSS for the low-BW CORESET may be comprised by the UE for rate-matching, and a resource comprised by the low-BW CORESET and the CSS for the low-BW CORESET is not available for at least one downlink (DL) data channel transmission comprised by the UE. Thus, other UEs (besides low-tier UEs) may be capable of rate-matching around the resources used by the low-BW CORESET-0 and CSS, by additionally interpreting the low-BW CORESET-0 and CSS form the system configuration information.

Figure 12:
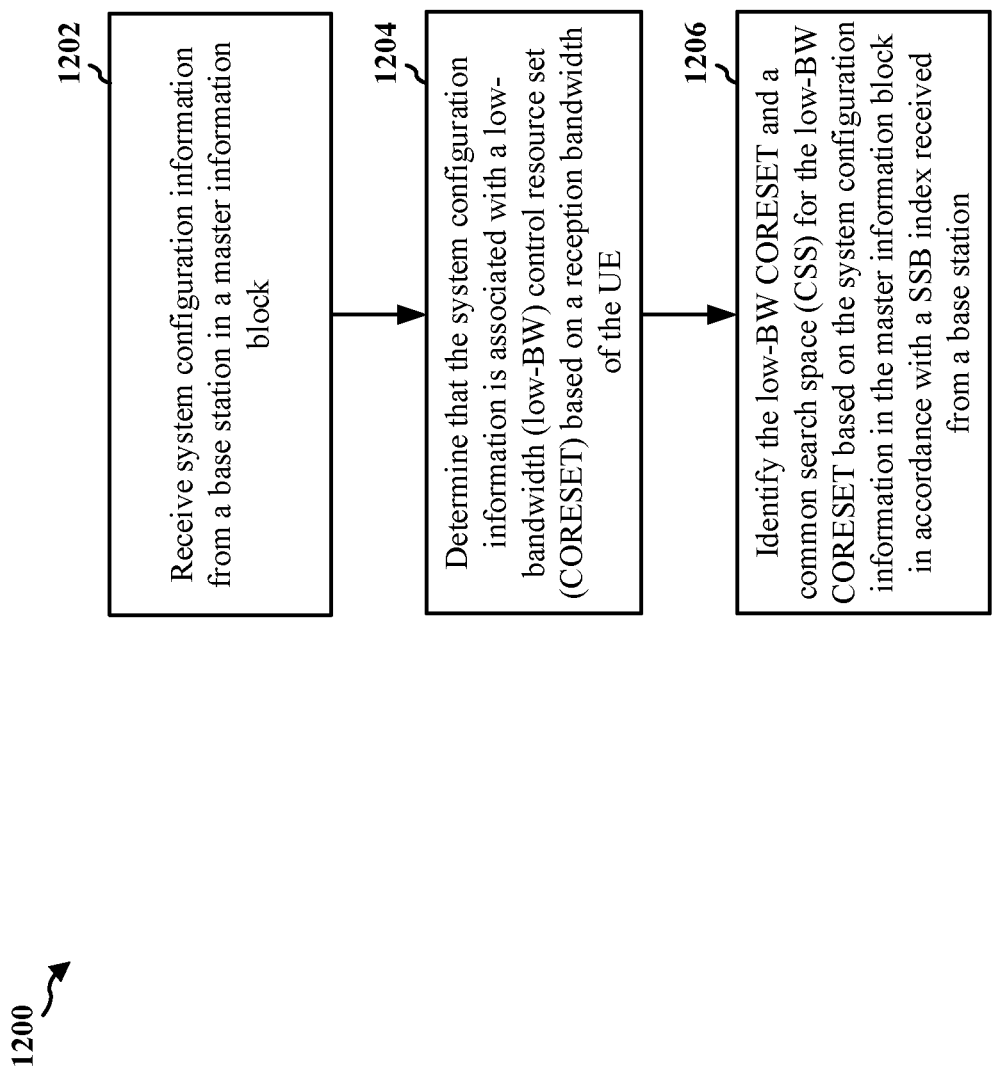
FIG. 12 is a flowchart of a method of wireless communication of a UE.

FIG. 12 is a flowchart 1200 of a method of wireless communication. The method may be performed by a UE (e.g., the UE 104, 350, the low-tier UE 730; the apparatus 1302/1302'; the processing system 1414, which may include the memory 360 and which may be the entire UE 350 or a component of the UE 350, such as the TX processor 368, the RX processor 356, and/or the controller/processor 359). The method allows a UE to identify a CORESET-0 from system configuration information based on a reception bandwidth of the UE. At 1202, the UE receives system configuration information from a base station in a master information block. For example, 1202 may be performed by reception component 1304 of FIG. 13. The system configuration information may comprise remaining system information (RMSI) configuration information. For instance, referring to FIG. 4, the UE may receive RMSI configuration 412 from a base station in a MIB.

At 1204, the UE determines that the system configuration information is associated with a low-bandwidth (low-BW) control resource set (CORESET) based on a reception bandwidth of the UE. For example, 1204 may be performed by determination component 1306 of FIG. 13. The system configuration information comprises a plurality of bits including one or more most significant bits (MSBs) and one or more least significant bits (LSBs). In one example, the system configuration information may be determined to be associated with a legacy CORESET and a CSS for the legacy CORESET when a bandwidth of the legacy CORESET is within the reception bandwidth of the UE; and the system configuration information may be determined to be associated with the low-BW CORESET and the CSS for the low-BW CORESET when the bandwidth of the legacy CORESET is greater than the reception bandwidth of the UE. The legacy CORESET and the CSS for the legacy CORESET may also be identified based at least in part on the one or more MSBs and the one or more LSBs of the system configuration information. For instance, referring to FIGS. 8A-11, the UE may determine whether to identify the system configuration information associated with a legacy CORESET-0 and CSS, or a low-BW CORESET-0 and CSS, based on the identified legacy CORESET-0 bandwidth associated with an identified SCS. If the identified legacy CORESET-0 bandwidth is lower than the low-tier UE's reception bandwidth, the legacy CORESET-0 may be determined from the system configuration information. Otherwise, the low-BW CORESET-0 may be determined from the system configuration information.

Finally, at 1206, the UE identifies a low-BW CORESET and a common search space (CSS) for the low-BW CORESET based on a system configuration information in a master information block (MIB) in accordance with a SSB index received from a base station. For example, 1206 may be performed by identification component 1308 of FIG. 13. The identified low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET. The one or more resource grids of the low-BW CORESET comprise one or more resource element groups (REGs) or REG bundles comprised by at least one physical downlink control channel (PDCCH) candidate associated with the legacy CORESET; and the identified CSS for the low-BW CORESET further identifies at least one of a system frame number (SFN), a slot-index, or a starting-symbol to search for the frequency-time resource grids. For instance, the UE may identify a low-BW CORESET-0 and associated CSS from RMSI configuration as described above with reference to FIGS. 8A-11.

For example, the UE identifies the low-BW CORESET and a common search space (CSS) for the low-BW CORESET from the system configuration information based on the determination. The determined low-BW CORESET comprises one or more frequency-time resource grids, and the determined CSS for the low-BW CORESET further identifies at least one of a system frame number (SFN), a slot-index, or a starting-symbol to search for the frequency-time resource grids. The low-BW CORESET may be determined from the one or more MSBs of the system configuration information, and the CSS for the low-BW CORESET may be determined from the one or more LSBs of the system configuration information. The CSS for the low-BW CORESET may be determined in accordance with a synchronization signal block (SSB) and may be identified based at least in part on at least one of: an SSB index identifier in a master information block (MIB) identified from the SSB; or a demodulation reference signal (DMRS) of a physical broadcast channel (PBCH) that carries the identified MIB. For instance, the UE may identify a low-BW CORESET-0 and associated CSS from RMSI configuration as described above with reference to FIGS. 8A-11.

In an aspect, the low-BW CORESET and the CSS for the low-BW CORESET may comprise at least one overlapping resource grid overlapped with a resource grid of a legacy CORESET and a CSS for the legacy CORESET, where the legacy CORESET and the CSS for the legacy CORESET are identified based at least in part on the one or more MSBs and the one or more LSBs of the system configuration information. For example, the legacy CORESET may be identified based at least in part on the one or more MSBs of the system configuration information, and the CSS for the legacy CORESET may be identified based at least in part on the one or more LSBs of the system configuration information. In one aspect, the at least one overlapping resource grid may comprise at least one resource grid being consecutive in both the time domain and the frequency domain. The at least one overlapping resource grid may comprise at least one of a central frequency resource grid, a starting resource grid, or an ending resource grid which is the same as the resource grid of the legacy CORESET.

In another aspect, the low-BW CORESET and the CSS for the low-BW CORESET may comprise at least one non-overlapping resource grid separated in time or frequency from the resource grid of a legacy CORESET and a CSS for the legacy CORESET, where the legacy CORESET and the CSS for the legacy CORESET are also identified based at least in part on the one or more MSBs and the one or more LSBs of the system configuration information. For example, the legacy CORESET may be identified based at least in part on the one or more MSBs of the system configuration information, and the CSS for the legacy CORESET may be identified based at least in part on the one or more LSBs of the system configuration information. The at least one non-overlapping resource grid may comprise at least one resource grid being consecutive in both the time domain and the frequency domain.

In a first option, the at least one non-overlapping resource grid may comprise a subset of resource element group (REG) bundles of the legacy CORESET, where the REG bundles are consecutive within the legacy CORESET. For example, at least one overlapping resource grid and the at least one non-overlapping resource grid of the low-BW CORESET may comprise all of the REG bundles of the legacy CORESET.

In an example, the low-BW CORESET and the CSS for the low-BW CORESET may comprise at least a group of resource grids that are consecutive in the time domain. For instance, the low-BW CORESET and the CSS for the low-BW CORESET may comprise at least a group of resource grids comprising the same central frequency. Alternatively, the low-BW CORESET and the CSS for the low-BW CORESET may comprise at least a group of resource grids that are non-consecutive in the time domain. For instance, the low-BW CORESET and the CSS for the low-BW CORESET may comprise at least a group of resource grids comprising different central frequencies.

In a second option, the at least one non-overlapping resource grid of the low-BW CORESET may comprise a subset of resource element groups (REGs) or REG bundles of the legacy CORESET, where at least one of the REGs or REG bundles are associated with one or more control channel elements (CCEs), and the one or more CCEs are associated with at least one physical downlink control channel (PDCCH) candidate. In one aspect, the low-BW CORESET and the CSS for the low-BW CORESET may comprise one or more resource grids, the one or more resource grids comprising at least one of: overlapping resource grids overlapped with a resource grid of a legacy CORESET and a CSS for the legacy CORESET, or non-overlapping resource grids separated in time or frequency from the resource grid of the legacy CORESET and the CSS for the legacy CORESET, and the one or more resource grids of the low-BW CORESET comprise one or more resource element groups (REGs) or REG bundles comprised by at least one physical downlink control channel (PDCCH) candidate associated with the legacy CORESET.

In a third option, the low-BW CORESET and the CSS for the low-BW CORESET may comprise only non-overlapping resource grids separated in time or frequency from the resource grids of the legacy CORESET without any overlapping resource grids overlapping with the resource grids of the legacy CORESET; and at least one of a control channel element (CCE) interleaving pattern, a resource element group (REG) bundle size, and an aggregation level (AL) of PDCCH candidates associated with the CORESET are different from the legacy CORESET.

Other aspects are disclosed. In one example, the low-BW CORESET and the CSS of the low-BW CORESET may be repeated in a repetition pattern over multiple SSB occasions, where the repetition pattern and a starting point of the repetition pattern are associated with a system frame number (SFN) of the CSS of the low-BW CORESET. In another example, a repetition quantity of the low-BW CORESET and the CSS of the low-BW CORESET may be determined based at least in part on a minimum repetition quantity requirement in accordance with a link budget of the UE receiving the low-BW CORESET.

In another example, a legacy CORESET comprises a plurality of control channel elements (CCEs) numbered in a first order, the plurality of CCEs are mapped to the low-BW CORESET in a second order reversed from the first order; and the legacy CORESET is identified based at least in part on the one or more MSBs of the system configuration information.

In another example, the at least one overlapping resource grid comprises a plurality of overlapping resource blocks associated with a group of consecutive indexes, where an interval of the indexes is a function of at least one of: the legacy CORESET; the CSS of the legacy CORESET; a system frame number (SFN) of the CSS of the legacy CORESET; a slot index within the SFN of the CSS of the legacy CORESET; or a starting symbol of the slot index within the SFN of the CSS of the legacy CORESET. In another example, each resource grid of the low-BW CORESET spans a frequency range lower than the reception bandwidth of the UE.

In another example, the MIB is received in a synchronization signal block (SSB), and a SSB index is identified based at least in part on at least one of the MIB and a demodulation reference signal (DMRS) of a physical broadcast channel (PBCH) carrying the identified MIB; and the low-BW CORESET comprises one or more resource grids including a plurality of resources, the plurality of resources being separate from resources used by the SSB comprising the identified MIB. For instance, the plurality of resources may be separate from resources used by the other SSBs that do not comprise the identified MIB. In another example, the CSS of the low-BW CORESET for the at least one non-overlapping resource grid is within one of a first slot containing the CSS for the legacy CORESET or within at least one slot proximal to the first slot. In another example, where the system configuration information is received in a first plurality of synchronization signal blocks (SSB) for initial access, a second plurality of one or more SSBs are at least associated with radio resource management (RRM); and where the non-overlapping resource grid includes a plurality of resources, the plurality of resources are separate from resources used by the second plurality of one or more SSBs.

In another example, a last orthogonal frequency-division multiplexing (OFDM) symbol of a first resource grid of the low-BW CORESET and the CSS of the low-BW CORESET is separated by one of a guard time from a first OFDM symbol of a second resource grid of the same low-BW CORESET and CSS of the low-BW CORESET, or a guard time from a first OFDM symbol of a synchronization signal block (SSB); and where the second resource grid comprises a central frequency being different from the central frequency of the first resource grid; and where the SSB comprises a central frequency being different from the central frequency of the first resource grid. In another example, a last OFDM symbol of a synchronization signal block (SSB) is separated by a guard time from a first OFDM symbol of a resource grid of the low-BW CORESET and the CSS of the low-BW CORESET, where the SSB comprises a central frequency being different from the central frequency of the resource grid.

In another example, the system configuration information includes one or more reserved bits, where a legacy CORESET and a CSS for the legacy CORESET are not associated with the reserved bits, and the low-BW CORESET and the CSS for the low-BW CORESET are identified from the one or more reserved bits.

In another example, the identified low-BW CORESET and the CSS for the low-BW CORESET are comprised by the UE for rate-matching, and a resource comprised by the low-BW CORESET and the CSS for the low-BW CORESET is not available for at least one downlink (DL) data channel transmission comprised by the UE.

Figure 13:
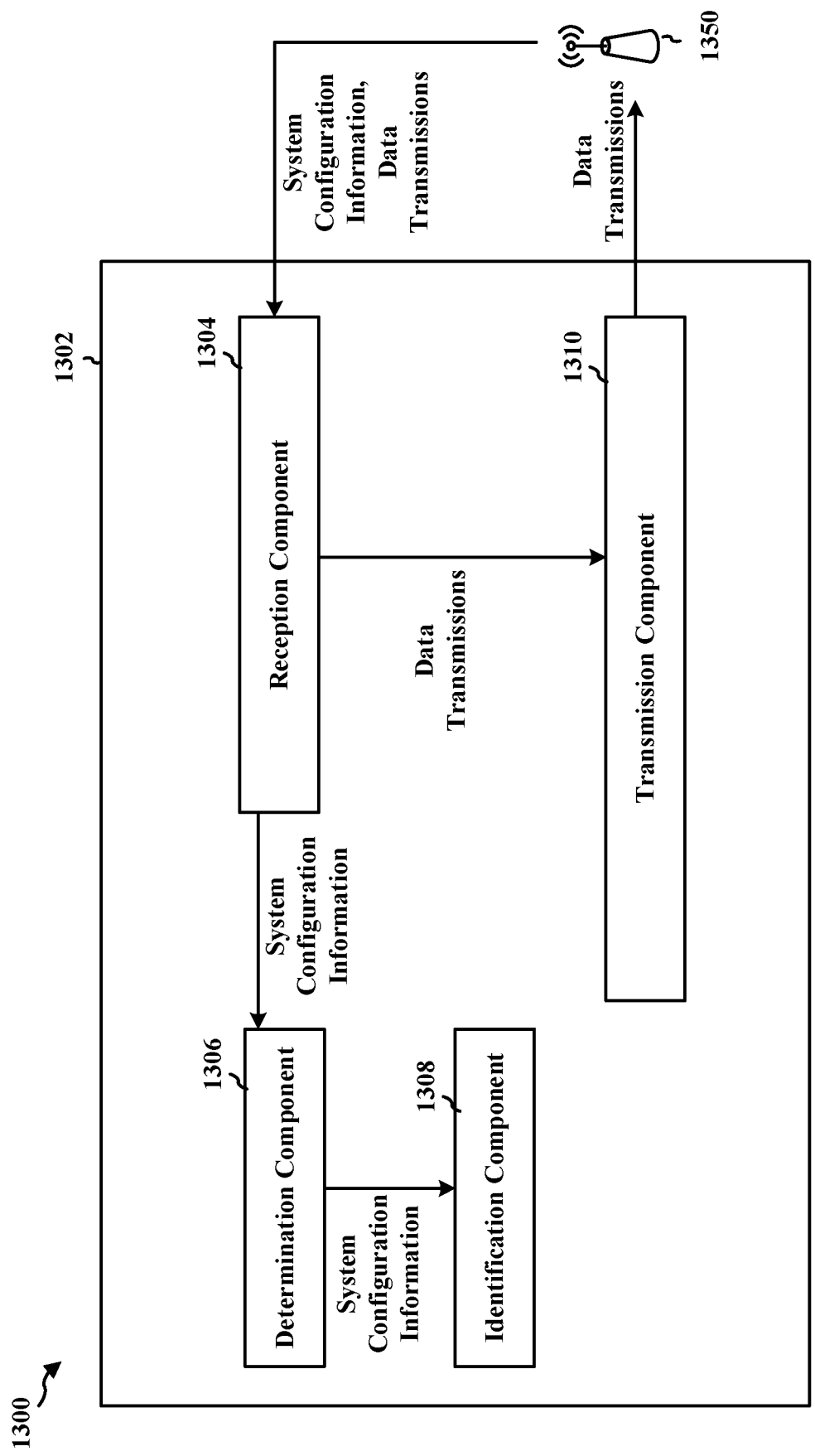
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE. The apparatus includes a reception component 1304 that receives data transmissions and system configuration information from a base station 1350 in a master information block, e.g., as described in connection with 1202 of FIG. 12. The apparatus includes a determination component 1306 that determines that the system configuration information is associated with a low-bandwidth (low-BW) control resource set (CORESET) based on a reception bandwidth of the UE, e.g., as described in connection with 1204 of FIG. 12. The apparatus includes an identification component 1308 that identifies the low-BW CORESET and a common search space (CSS) for the low-BW CORESET from the system configuration information based on the determination, e.g., as described in connection with 1206 of FIG. 12. The apparatus also includes a transmission component 1310, which transmits data transmissions to the base station 1350.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
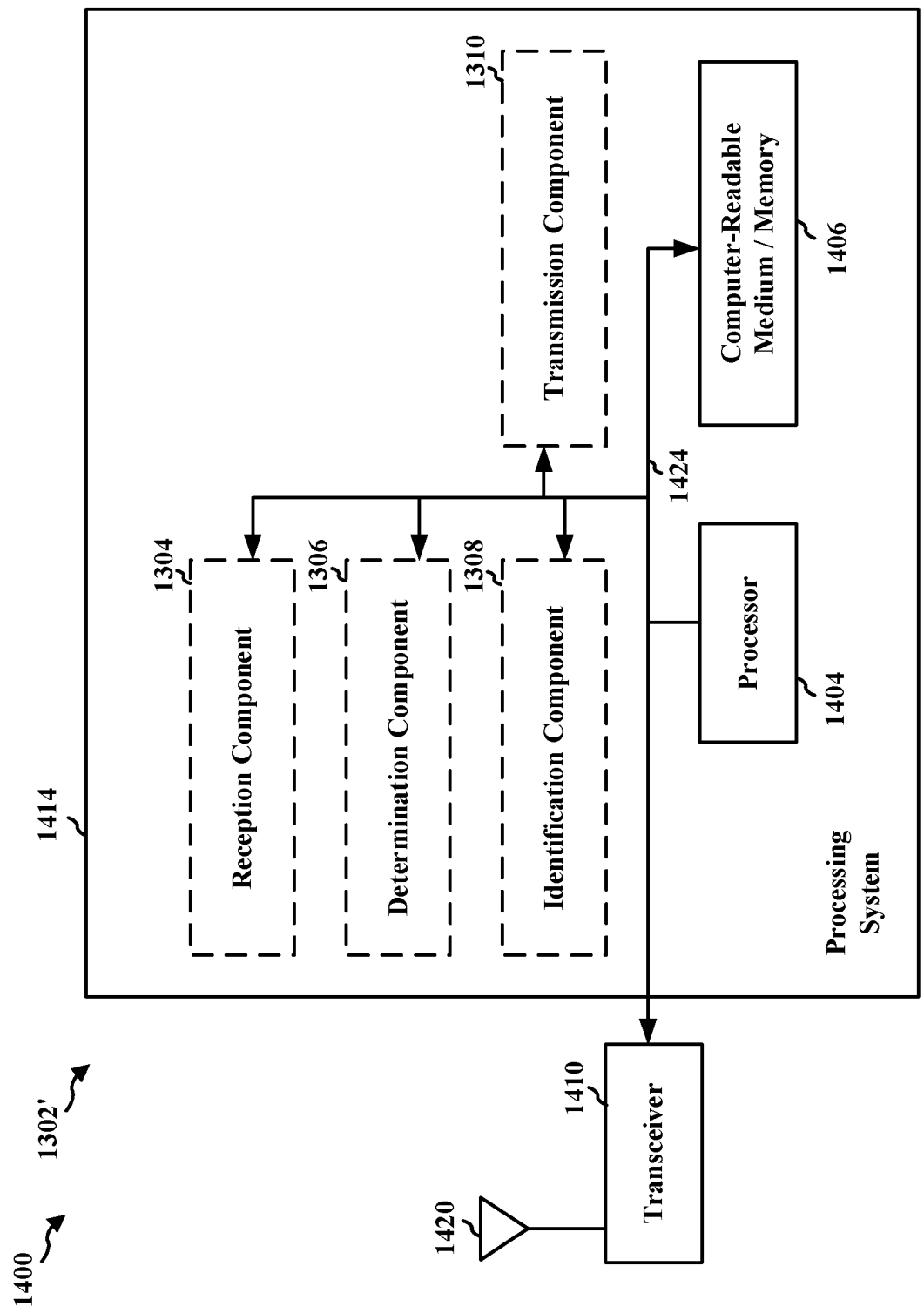
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication includes means for identifying a low-BW CORESET and a common search space (CSS) for the low-BW CORESET based on a system configuration information in a master information block (MIB) in accordance with a SSB index received from a base station, wherein the identified low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and wherein the one or more resource grids of the low-BW CORESET comprise one or more resource element groups (REGs) or REG bundles comprised by at least one physical downlink control channel (PDCCH) candidate associated with the legacy CORESET; and the identified CSS for the low-BW CORESET further identifies at least one of a system frame number (SFN), a slot-index, or a starting-symbol to search for the frequency-time resource grids. The apparatus 1302/1302' may also include means for receiving system configuration information from a base station in a master information block; and means for determining that the system configuration information is associated with a low-bandwidth (low-BW) control resource set (CORESET) based on a reception bandwidth of the UE. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
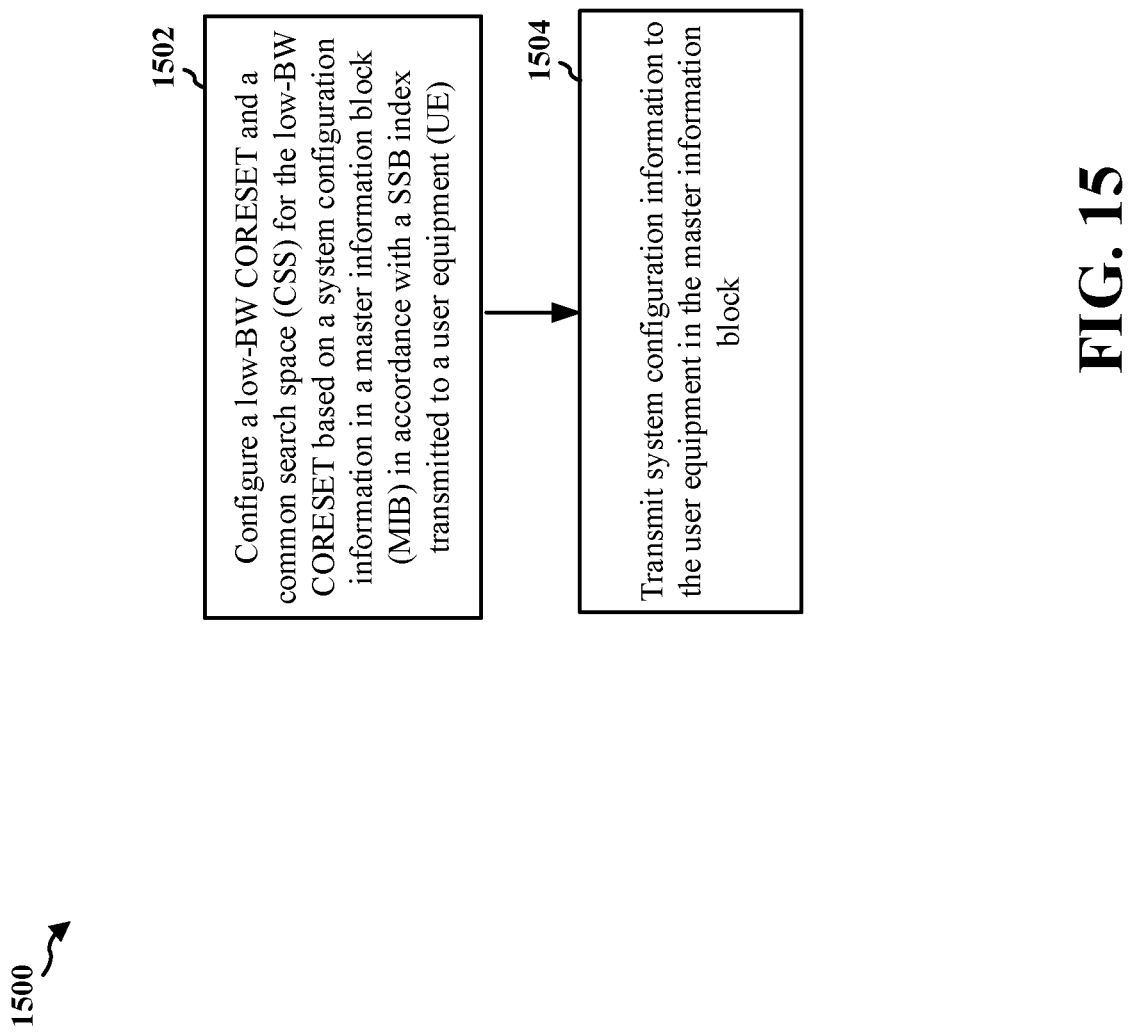
FIG. 15 is a flowchart of a method of wireless communication of a base station.

FIG. 15 is a flowchart 1500 of a method of wireless communication. The method may be performed by a base station (e.g., the base station 102/180, 310, 1350; the apparatus 1602/1602'; the processing system 1714, which may include the memory 376 and which may be the entire base station 310 or a component of the base station 310, such as the TX processor 316, the RX processor 370, and/or the controller/processor 375). The method allows a base station to configure a CORESET-0 from system configuration information for a low-tier UE to identify based on a reception bandwidth of the UE.

At 1502, the apparatus configures a low-BW CORESET and a common search space (CSS) for the low-BW CORESET based on a system configuration information in a master information block (MIB) in accordance with a SSB index transmitted to a user equipment (UE). For example, 1502 may be performed by configuration component 1606 of FIG. 13. The configured low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET. The one or more resource grids of the low-BW CORESET comprise one or more resource element groups (REGs) or REG bundles comprised by at least one physical downlink control channel (PDCCH) candidate associated with the legacy CORESET; and the configured CSS for the low-BW CORESET further identifies at least one of a system frame number (SFN), a slot-index, or a starting-symbol to search for the frequency-time resource grids. For example, the base station configures the system configuration information to be associated with a low-bandwidth (low-BW) control resource set (CORESET) and a common search space (CSS) for the low-BW CORESET based on a reception bandwidth of the UE. The system configuration information comprises a plurality of bits including one or more most significant bits (MSBs) and one or more least significant bits (LSBs). The low-BW CORESET comprises one or more frequency-time resource grids, and the CSS for the low-BW CORESET further identifies at least one of a system frame number (SFN), a slot-index, or a starting-symbol to identify the frequency-time resource grids. The system configuration information may comprise remaining system information (RMSI) configuration information. For instance, the base station may configure RMSI configuration 412 to be associated with a low-BW CORESET-0 and associated CSS as described above with reference to FIGS. 8A-11.

At 1504, the base station transmits the system configuration information to a user equipment (UE) in a master information block (MIB). For example, 1504 may be performed by transmission component 1608 of FIG. 16. For instance, referring to FIG. 4, the base station may transmit RMSI configuration 412 to a UE in a MIB.

The low-BW CORESET may be configured from the one or more MSBs of the system configuration information, and the CSS for the low-BW CORESET may be configured from the one or more LSBs of the system configuration information. The CSS for the low-BW CORESET may be configured in accordance with a synchronization signal block (SSB) and may be configured based at least in part on at least one of: a SSB index identifier in a master information block (MIB) identified from the SSB; or a demodulation reference signal (DMRS) of a physical broadcast channel (PBCH) that carries the identified MIB.

In an aspect, the low-BW CORESET and the CSS for the low-BW CORESET may comprise at least one overlapping resource grid overlapped with a resource grid of a legacy CORESET and a CSS for the legacy CORESET, where the legacy CORESET and the CSS for the legacy CORESET are configured based at least in part on the one or more MSBs and the one or more LSBs of the system configuration information. In one aspect, the at least one overlapping resource grid may comprise at least one resource grid being consecutive in both the time domain and the frequency domain. The at least one overlapping resource grid may comprise at least one of a central frequency resource grid, a starting resource grid, or an ending resource grid which is the same as the resource grid of the legacy CORESET.

In another aspect, the low-BW CORESET and the CSS for the low-BW CORESET may comprise at least one non-overlapping resource grid separated in time or frequency from the resource grid of a legacy CORESET and a CSS for the legacy CORESET, where the legacy CORESET and the CSS for the legacy CORESET are also configured based at least in part on the one or more MSBs and the one or more LSBs of the system configuration information. The at least one non-overlapping resource grid may comprise at least one resource grid being consecutive in both the time domain and the frequency domain.

In a further aspect, the low-BW CORESET and the CSS for the low-BW CORESET may comprise at least one overlapping resource grid overlapped with a resource grid of a legacy CORESET and a CSS for the legacy CORESET; the low-BW CORESET and the CSS for the low-BW CORESET may comprise at least one non-overlapping resource grid separated in time or frequency from the resource grid of the legacy CORESET and the CSS for the legacy CORESET; the legacy CORESET is configured based at least in part on the one or more MSBs of the system configuration information, and the CSS for the legacy CORESET is configured based at least in part on the one or more LSBs of the system configuration information.

In a first option, the at least one non-overlapping resource grid may comprise a subset of resource element group (REG) bundles of the legacy CORESET, where the REG bundles are consecutive within the legacy CORESET. For example, the at least one overlapping resource grid and the at least one non-overlapping resource grid of the low-BW CORESET may comprise all of the REG bundles of the legacy CORESET.

In an example, the low-BW CORESET and the CSS for the low-BW CORESET may comprise at least a group of resource grids that are consecutive in the time domain. For instance, the low-BW CORESET and the CSS for the low-BW CORESET may comprise at least a group of resource grids comprising the same central frequency. Alternatively, the low-BW CORESET and the CSS for the low-BW CORESET may comprise at least a group of resource grids that are non-consecutive in the time domain. For instance, the low-BW CORESET and the CSS for the low-BW CORESET may comprise at least a group of resource grids comprising different central frequencies.

In a second option, the at least one non-overlapping resource grid of the low-BW CORESET may comprise a subset of resource element groups (REGs) or REG bundles of the legacy CORESET, where at least one of the REGs or REG bundles are associated with one or more control channel elements (CCEs), and the one or more CCEs are associated with at least one physical downlink control channel (PDCCH) candidate. In one aspect, the low-BW CORESET and the CSS for the low-BW CORESET may comprise one or more resource grids, the one or more resource grids comprising at least one of: overlapping resource grids overlapped with a resource grid of a legacy CORESET and a CSS for the legacy CORESET, or non-overlapping resource grids separated in time or frequency from the resource grid of the legacy CORESET and the CSS for the legacy CORESET, and the one or more resource grids of the low-BW CORESET comprise one or more resource element groups (REGs) or REG bundles comprised by at least one physical downlink control channel (PDCCH) candidate associated with the legacy CORESET.

In a third option, the low-BW CORESET and the CSS for the low-BW CORESET may comprise only non-overlapping resource grids separated in time or frequency from the resource grids of the legacy CORESET without any overlapping resource grids overlapping with the resource grids of the legacy CORESET; and at least one of a control channel element (CCE) interleaving pattern, a resource element group (REG) bundle size, and an aggregation level (AL) of PDCCH candidates associated with the CORESET are different from the legacy CORESET.

Other aspects are disclosed. In one example, the low-BW CORESET and the CSS of the low-BW CORESET may be repeated in a repetition pattern over multiple SSB occasions, where the repetition pattern and a starting point of the repetition pattern are associated with a system frame number (SFN) of the CSS of the low-BW CORESET. In another example, a repetition quantity of the low-BW CORESET and the CSS of the low-BW CORESET may be configured based at least in part on a minimum repetition quantity requirement in accordance with a link budget of the UE receiving the low-BW CORESET.

In another example, the system configuration information may be configured to be associated with a legacy CORESET and a CSS for the legacy CORESET when a bandwidth of the legacy CORESET is within the reception bandwidth of the UE; and the system configuration information may be configured to be associated with the low-BW CORESET and the CSS for the low-BW CORESET when the bandwidth of the legacy CORESET is greater than the reception bandwidth of the UE. The legacy CORESET and the CSS for the legacy CORESET may also be configured based at least in part on the one or more MSBs and the one or more LSBs of the system configuration information.

In another example, a legacy CORESET comprises a plurality of control channel elements (CCEs) numbered in a first order, the plurality of CCEs are mapped to the low-BW CORESET in a second order reversed from the first order; and the legacy CORESET is configured based at least in part on the one or more MSBs of the system configuration information.

In another example, the at least one overlapping resource grid comprises a plurality of overlapping resource blocks associated with a group of consecutive indexes, where an interval of the indexes is a function of at least one of: the legacy CORESET; the CSS of the legacy CORESET; a system frame number (SFN) of the CSS of the legacy CORESET; a slot index within the SFN of the CSS of the legacy CORESET; or a starting symbol of the slot index within the SFN of the CSS of the legacy CORESET. In another example, each resource grid of the low-BW CORESET spans a frequency range lower than the reception bandwidth of the UE.

In another example, the MIB is transmitted in a synchronization signal block (SSB), and a SSB index is based at least in part on at least one of the MIB and a demodulation reference signal (DMRS) of a physical broadcast channel (PBCH) carrying the identified MIB; and the low-BW CORESET comprises one or more resource grids including a plurality of resources, the plurality of resources being separate from resources used by the SSB comprising the identified MIB. For instance, the plurality of resources may be separate from resources used by the other SSBs that do not comprise the identified MIB. In another example, the CSS of the low-BW CORESET for the at least one non-overlapping resource grid is within one of a first slot containing the CSS for the legacy CORESET or within at least one slot proximal to the first slot. In another example, where the system configuration information is transmitted in a first plurality of synchronization signal blocks (SSB) for initial access, a second plurality of one or more SSBs are at least associated with radio resource management (RRM); and where the non-overlapping resource grid includes a plurality of resources, the plurality of resources are separate from resources used by the second plurality of one or more SSBs.

In another example, a last orthogonal frequency-division multiplexing (OFDM) symbol of a first resource grid of the low-BW CORESET and the CSS of the low-BW CORESET is separated by one of a guard time from a first OFDM symbol of a second resource grid of the same low-BW CORESET and CSS of the low-BW CORESET, or a guard time from a first OFDM symbol of a synchronization signal block (SSB); and where the second resource grid comprises a central frequency being different from the central frequency of the first resource grid; and where the SSB comprises a central frequency being different from the central frequency of the first resource grid. In another example, a last OFDM symbol of a synchronization signal block (SSB) is separated by a guard time from a first OFDM symbol of a resource grid of the low-BW CORESET and the CSS of the low-BW CORESET, where the SSB comprises a central frequency being different from the central frequency of the resource grid.

In another example, the system configuration information includes one or more reserved bits, where a legacy CORESET and a CSS for the legacy CORESET are not associated with the reserved bits, and the low-BW CORESET and the CSS for the low-BW CORESET are configured from the one or more reserved bits.

In another example, the configured low-BW CORESET and the CSS for the low-BW CORESET are configured for rate-matching by the UE, and a resource comprised by the low-BW CORESET and the CSS for the low-BW CORESET is not available for at least one downlink (DL) data channel transmission to the UE.

Figure 16:
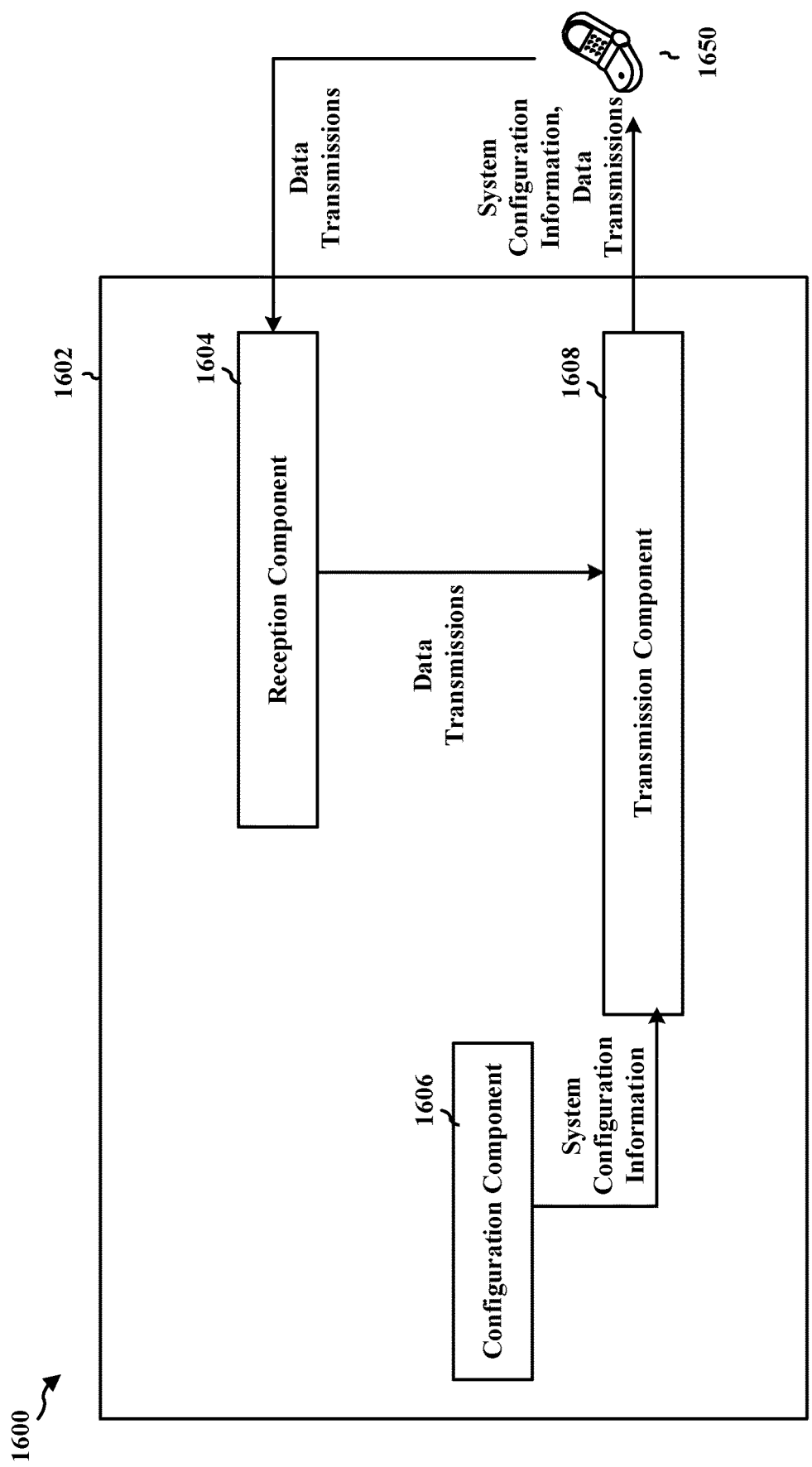
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a base station. The apparatus includes a reception component 1604 that receives data transmissions from a UE 1650. The apparatus includes a configuration component 1606 that configures the system configuration information to be associated with a low-bandwidth (low-BW) control resource set (CORESET) and a common search space (CSS) for the low-BW CORESET based on a reception bandwidth of the UE, e.g., as described in connection with 1502 of FIG. 15. The apparatus also includes a transmission component 1608, which transmits data transmissions and system configuration information to the UE 1650 in a master information block (MIB), e.g., as described in connection with 1504 of FIG. 15.

The apparatus may include additional components that perform each of the blocks of the algorithm in the aforementioned flowchart of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
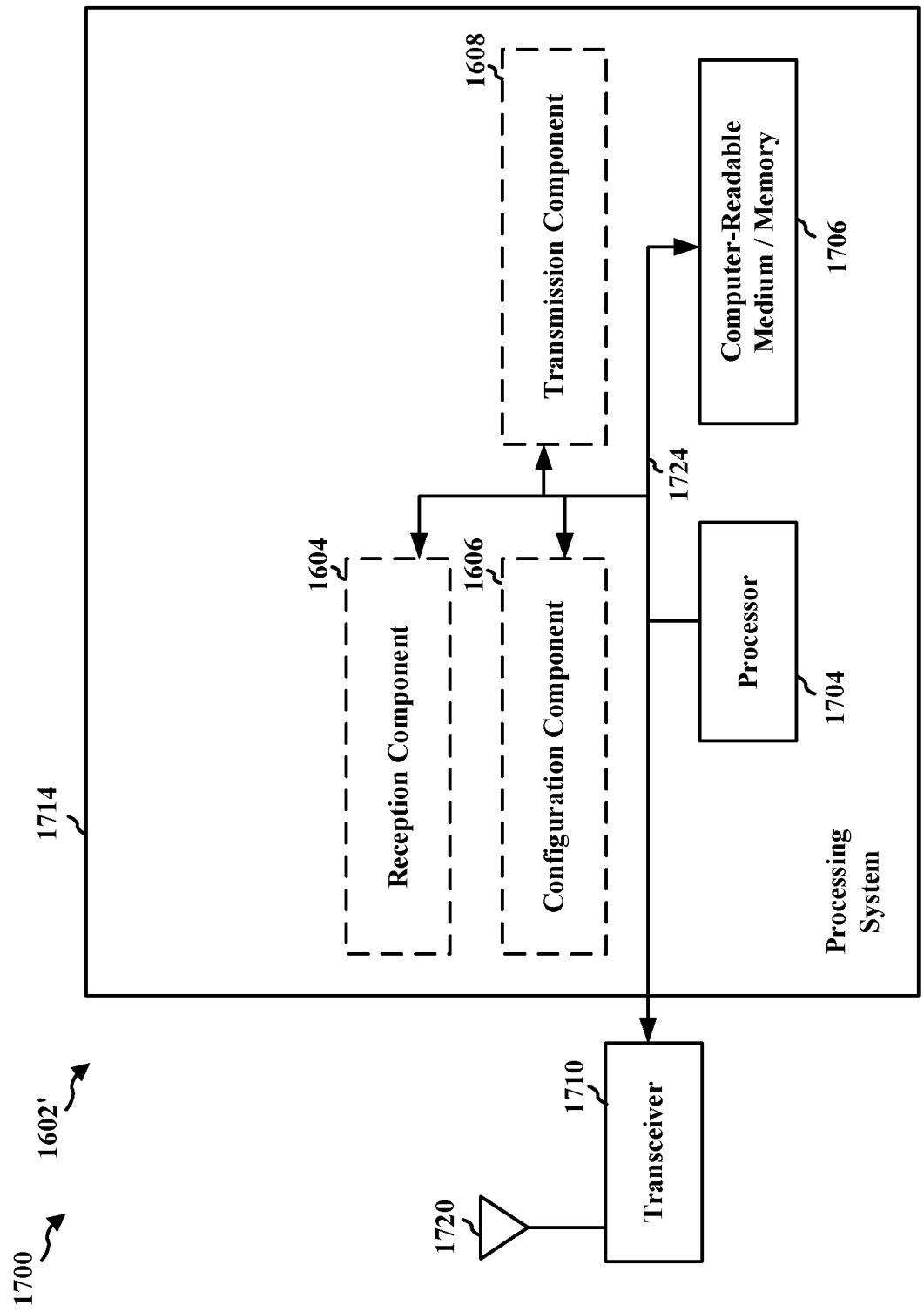
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1608, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may be the entire base station (e.g., see 310 of FIG. 3).

In one configuration, the apparatus 1602/1602' for wireless communication includes means for configuring a low-BW CORESET and a common search space (CSS) for the low-BW CORESET based on a system configuration information in a master information block (MIB) in accordance with a SSB index transmitted to a user equipment (UE), wherein the configured low-BW CORESET comprises one or more frequency-time resource grids including at least one of: one or more overlapping resource grids overlapped with a resource grid of a legacy CORESET and a CSS for the legacy CORESET, or one or more non-overlapping resource grids separated in time or frequency from the resource grid of the legacy CORESET and the CSS for the legacy CORESET, and wherein the one or more resource grids of the low-BW CORESET comprise one or more resource element groups (REGs) or REG bundles comprised by at least one physical downlink control channel (PDCCH) candidate associated with the legacy CORESET; and the configured CSS for the low-BW CORESET further identifies at least one of a system frame number (SFN), a slot-index, or a starting-symbol to search for the frequency-time resource grids. The apparatus 1602/1602' also includes means for transmitting system configuration information to a user equipment (UE) in a master information block (MIB). The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Thus, the present disclosure provides a low-BW CORESET-0 and associated CSS which low-tier UEs may identify from the system configuration information (for example, RMSI configuration) in MIB. The base station may allocate different frequency and time-domain resources in order to optimize resource utilization of the low-BW CORESET-0, and the low-tier UEs may identify these resources of CORESET-0 and CSS from the system configuration information. As a result, low tier UEs may operate in a same cell as legacy UEs without the need for the base station to transmit additional signaling to either legacy UEs or lower tier UEs for the UEs to receive their respective CORESET-0's and identify PDCCH.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   identifying a low-bandwidth (low-BW) control resource set (CORESET) and a common search space (CSS) for the low-BW CORESET based on a system configuration information in a master information block (MIB) in accordance with a synchronization signal block (SSB) index received from a base station, wherein the identified low-BW CORESET comprises one or more frequency-time resource grids including at least one of:
   one or more overlapping resource grids overlapped with a resource grid of a legacy CORESET and a legacy CSS for the legacy CORESET, or
   one or more non-overlapping resource grids separated in time or frequency from the resource grid of the legacy CORESET and the CSS for the legacy CORESET, and
   wherein one or more resource grids of the low-BW CORESET comprise one or more resource element groups (REGs) or REG bundles comprised by at least one physical downlink control channel (PDCCH) candidate associated with the legacy CORESET;
   and the identified CSS for the low-BW CORESET further identifies at least one of a system frame number (SFN), a slot-index, or a starting-symbol to search for the one or more frequency-time resource grids.

2. The method of claim 1, wherein the low-BW CORESET and the CSS for the low-BW CORESET comprise at least a group of resource grids that are consecutive in a time domain.

3. The method of claim 1, wherein the low-BW CORESET and the CSS for the low-BW CORESET comprise at least a group of resource grids comprising a same central frequency.

4. The method of claim 1, wherein the low-BW CORESET and the CSS for the low-BW CORESET comprise at least a group of resource grids that are non-consecutive in a time domain.

5. The method of claim 1, wherein the low-BW CORESET and the CSS for the low-BW CORESET comprise at least a group of resource grids comprising different central frequencies.

6. The method of claim 1, wherein the one or more overlapping resource grids comprise at least one resource grid being consecutive in both a time domain and a frequency domain.

7. The method of claim 1, wherein the one or more overlapping resource grids comprise at least one of a central frequency resource grid, a starting resource grid, or an ending resource grid which is the same as the resource grid of the legacy CORESET.

8. The method of claim 1, wherein at least one non-overlapping resource grid comprises at least one resource grid being consecutive in both a time domain and a frequency domain.

9. The method of claim 1, wherein at least one non-overlapping resource grid comprises a subset of REG bundles of the legacy CORESET, wherein the REG bundles are consecutive within the legacy CORESET.

10. The method of claim 1, wherein at least one overlapping resource grid and at least one non-overlapping resource grid of the low-BW CORESET comprise all of the REG bundles of the legacy CORESET.

11. The method of claim 1, wherein at least one non-overlapping resource grid of the low-BW CORESET comprises a subset of REGs or REG bundles of the legacy CORESET, wherein at least one of the REGs or REG bundles are associated with one or more control channel elements (CCEs), wherein the one or more CCEs are associated with the at least one PDCCH candidate.

12. The method of claim 1, wherein the low-BW CORESET and the CSS of the low-BW CORESET are repeated in a repetition pattern over multiple SSB occasions, wherein the repetition pattern and a starting point of the repetition pattern are associated with a second SFN of the CSS of the low-BW CORESET.

13. The method of claim 12, wherein the repetition pattern further comprises:
   the CSS of the low-BW CORESET associated with a first SSB index comprising a first repeated low-BW CORESET associated with the first SSB index during a first SS burst periodicity, and the CSS of the low-BW CORESET associated with a second SSB index comprising a second repeated low-BW CORESET associated with the second SSB index during a second SS burst periodicity.

14. The method of claim 12, wherein the repetition pattern further comprises:
the CSS of the low-BW CORESET associated with a first SSB index comprising a repeated low-BW CORESET associated with the first SSB index across multiple SS burst periodicities.

15. The method of claim 1, wherein a repetition quantity of the low-BW CORESET and the CSS of the low-BW CORESET is determined based at least in part on a minimum repetition quantity requirement in accordance with a link budget of the UE receiving the low-BW CORESET.

16. The method of claim 1, wherein the system configuration information is determined to be associated with the legacy CORESET and the CSS for the legacy CORESET when a bandwidth of the legacy CORESET is within a reception bandwidth of the UE; and
wherein the system configuration information is determined to be associated with the low-BW CORESET and the CSS for the low-BW CORESET when the bandwidth of the legacy CORESET is greater than the reception bandwidth of the UE.

17. The method of claim 1, wherein the legacy CORESET comprises a plurality of control channel elements (CCEs) numbered in a first order, and wherein the plurality of CCEs are mapped to the low-BW CORESET in a second order reversed from the first order.

18. The method of claim 1, wherein the one or more overlapping resource grids comprise a plurality of overlapping resource blocks associated with a group of consecutive indexes, wherein an interval of the group of consecutive indexes is a function of at least one of:
the legacy CORESET;
the CSS of the legacy CORESET;
a second SFN of the CSS of the legacy CORESET;
a slot index within the SFN of the CSS of the legacy CORESET; or
a starting symbol of the slot index within the SFN of the CSS of the legacy CORESET.

19. The method of claim 1, wherein each resource grid of the low-BW CORESET spans a frequency range lower than a reception bandwidth of the UE.

20. The method of claim 1, wherein the MIB is received in a SSB; and
the one or more resource grids comprised by the low-BW CORESET and the CSS of the low-BW CORESET are separated from resources used by the SSB comprising the identified MIB.

21. The method of claim 20, wherein the one or more resource grids comprised by the low-BW CORESET and the CSS of the low-BW CORESET are separated from other resources used by other SSBs that do not comprise the identified MIB.

22. The method of claim 1, wherein the CSS of the low-BW CORESET for at least one non-overlapping resource grid is within one of a first slot containing the CSS for the legacy CORESET or within at least one slot proximal to the first slot, wherein the system configuration information is received in a first plurality of SSBs for initial access, wherein a second plurality of one or more SSBs are at least associated with radio resource management (RRM); and
wherein the one or more non-overlapping resource grids comprised by the low-BW CORESET and the CSS of the low-BW CORESET are separated from resources used by the second plurality of one or more SSBs.

23. The method of claim 1, wherein a last orthogonal frequency-division multiplexing (OFDM) symbol of a first resource grid of the low-BW CORESET and the CSS of the low-BW CORESET is separated by one of a first guard time from a first initial OFDM symbol of a second resource grid of the low-BW CORESET and the CSS of the low-BW CORESET, or a second guard time from a second initial OFDM symbol of a SSB; and
wherein the second resource grid comprises a second central frequency being different from a first central frequency of the first resource grid; and
wherein the SSB comprises a third central frequency being different from the first central frequency of the first resource grid.

24. The method of claim 1, wherein a last OFDM symbol of a SSB is separated by a guard time from a first OFDM symbol of the resource grid of the low-BW CORESET and the CSS of the low-BW CORESET,
wherein the SSB comprises a second central frequency being different from a first central frequency of the resource grid.

25. The method of claim 1, wherein the system configuration information includes one or more reserved bits, wherein the legacy CORESET and the CSS for the legacy CORESET are not associated with the one or more reserved bits, and the low-BW CORESET and the CSS for the low-BW CORESET are identified from the one or more reserved bits.

26. The method of claim 1, wherein the identified low-BW CORESET and the CSS for the low-BW CORESET are comprised by the UE for rate-matching, and wherein a resource comprised by the low-BW CORESET and the CSS for the low-BW CORESET is not available for at least one downlink (DL) data channel transmission comprised by the UE.

27. An apparatus for wireless communication, comprising:
memory; and
at least one processor coupled to the memory and configured to:
identify a low-bandwidth (low-BW) control resource set (CORESET) and a common search space (CSS) for the low-BW CORESET based on a system configuration information in a master information block (MIB) in accordance with a synchronization signal block (SSB) index received from a base station, wherein the identified low-BW CORESET comprises one or more frequency-time resource grids including at least one of:
one or more overlapping resource grids overlapped with a resource grid of a legacy CORESET and a legacy CSS for the legacy CORESET, or
one or more non-overlapping resource grids separated in time or frequency from the resource grid of the legacy CORESET and the legacy CSS for the legacy CORESET, and
wherein one or more resource grids of the low-BW CORESET comprise one or more resource element groups (REGs) or REG bundles comprised by at least one physical downlink control channel (PDCCH) candidate associated with the legacy CORESET;
and the identified CSS for the low-BW CORESET further identifies at least one of a system frame number (SFN), a slot-index, or a starting-symbol to search for the one or more frequency-time resource grids.

28. A method of wireless communication at a base station, the method comprising:
configuring a low-bandwidth (low-BW) control resource set (CORESET) and a common search space (CSS) for the low-BW CORESET based on a system configuration information in a master information block (MIB) in accordance with a synchronization signal block (SSB) index transmitted to a user equipment (UE), wherein the configured low-BW CORESET comprises one or more frequency-time resource grids including at least one of:
one or more overlapping resource grids overlapped with a resource grid of a legacy CORESET and a legacy CSS for the legacy CORESET, or
one or more non-overlapping resource grids separated in time or frequency from the resource grid of the legacy CORESET and the legacy CSS for the legacy CORESET, and
wherein one or more resource grids of the low-BW CORESET comprise one or more resource element groups (REGs) or REG bundles comprised by at least one physical downlink control channel (PDCCH) candidate associated with the legacy CORESET;
and the configured CSS for the low-BW CORESET further identifies at least one of a system frame number (SFN), a slot-index, or a starting-symbol to search for the one or more frequency-time resource grids.

29. The method of claim 28, wherein the low-BW CORESET and the CSS for the low-BW CORESET comprise at least a group of resource grids:
that are consecutive in a time domain;
comprising a same central frequency;
that are non-consecutive in the time domain; or
comprising different central frequencies.

30. The method of claim 28, wherein the one or more overlapping resource grids comprise:
at least one resource grid being consecutive in both a time domain and a frequency domain;
at least one of a central frequency resource grid, a starting resource grid, or an ending resource grid which is the same as the resource grid of the legacy CORESET; or
a subset of REG bundles of the legacy CORESET, wherein the REG bundles are consecutive within the legacy CORESET.

31. The method of claim 28, wherein at least one overlapping resource grid and at least one non-overlapping resource grid of the low-BW CORESET comprise all of the REG bundles of the legacy CORESET.

32. The method of claim 28, wherein at least one non-overlapping resource grid of the low-BW CORESET comprises a subset of REGs or REG bundles of the legacy CORESET, wherein at least one of the REGs or REG bundles are associated with one or more control channel elements (CCEs), wherein the one or more CCEs are associated with the at least one PDCCH candidate.

33. The method of claim 28, wherein the low-BW CORESET and the CSS of the low-BW CORESET repeated in a repetition pattern over multiple SSB occasions, wherein the repetition pattern and a starting point of the repetition pattern are associated with a second SFN of the CSS of the low-BW CORESET, wherein the repetition pattern further comprises:
the CSS of the low-BW CORESET associated with a first SSB index comprising a first repeated low-BW CORESET associated with the first SSB index during a first SS burst periodicity, and the CSS of the low-BW CORESET associated with a second SSB index comprising a second repeated low-BW CORESET associated with the second SSB index during a second SS burst periodicity or
the CSS of the low-BW CORESET associated with the first SSB index comprising a repeated low-BW CORESET associated with the first SSB index across multiple SS burst periodicities.

34. The method of claim 28, wherein a repetition quantity of the low-BW CORESET and the CSS of the low-BW CORESET is configured based at least in part on a minimum repetition quantity requirement in accordance with a link budget of the UE receiving the low-BW CORESET.

35. An apparatus for wireless communication, comprising:
memory; and
at least one processor coupled to the memory and configured to:
configure a low-bandwidth (low-BW) control resource set (CORESET) and a common search space (CSS) for the low-BW CORESET based on a system configuration information in a master information block (MIB) in accordance with a synchronization signal block (SSB) index transmitted to a user equipment (UE), wherein the configured low-BW CORESET comprises one or more frequency-time resource grids including at least one of:
one or more overlapping resource grids overlapped with a resource grid of a legacy CORESET and a legacy CSS for the legacy CORESET, or
one or more non-overlapping resource grids separated in time or frequency from the resource grid of the legacy CORESET and the legacy CSS for the legacy CORESET, and
wherein one or more resource grids of the low-BW CORESET comprise one or more resource element groups (REGs) or REG bundles comprised by at least one physical downlink control channel (PDCCH) candidate associated with the legacy CORESET;
and the configured CSS for the low-BW CORESET further identifies at least one of a system frame number (SFN), a slot-index, or a starting-symbol to search for the one or more frequency-time resource grids.

* * * * *